US012561506B1

(12) United States Patent (10) Patent No.: US 12,561,506 B1
Ershov et al. (45) Date of Patent: Feb. 24, 2026

(54) EXTRACTION BASED ON HETEROGENEOUS MESHING TECHNIQUES

(71) Applicant: Diakopto, Inc., San Jose, CA (US)

(72) Inventors: Maxim Ershov, San Jose, CA (US); Vitaliy Schetinin, Warsaw (PL)

(73) Assignee: ANSYS, INC., Canonsburg, PA (US)

( * ) Notice: Subject to any disclaimer, the term of this patent is extended or adjusted under 35 U.S.C. 154(b) by 569 days.

(21) Appl. No.: 18/111,576

(22) Filed: Feb. 19, 2023

Related U.S. Application Data

(60) Provisional application No. 63/312,053, filed on Feb. 20, 2022.

(51) Int. Cl.
*G06F 30/392* (2020.01)
*G06F 119/02* (2020.01)

(52) U.S. Cl.
CPC ........ *G06F 30/392* (2020.01); *G06F 2119/02* (2020.01)

(58) Field of Classification Search
USPC ........ 716/100, 101, 103, 110, 111, 112, 118, 716/119
See application file for complete search history.

(56) References Cited

U.S. PATENT DOCUMENTS

| | | | | |
|---|---|---|---|---|
| 8,732,640 | B1 * | 5/2014 | Krishnan | G06F 30/398 |
| | | | | 716/110 |
| 2009/0278569 | A1 * | 11/2009 | Taoka | H03K 19/094 |
| | | | | 430/30 |
| 2020/0380192 | A1 * | 12/2020 | MacRae | G06F 30/392 |

* cited by examiner

*Primary Examiner* — Brian Ngo

(57) ABSTRACT

A software tool used to assess and/or simulate an integrated circuit ("IC") layout employs heterogeneous resistance extraction and/or meshing, to combine advantages of a relatively compact parasitics file size and robustness for effective simulation and electrical performance analysis. In one embodiment, filters are automatically applied (or are manually specified by a user) to select structures, layers, geographic regions, nets or other areas of a design which will receive additional extraction and/or meshing scrutiny, with the remainder of the design being subjected to default practices. For example, software can be scripted (or rule driven) to perform 1D meshing for in-layer electrical pathways while providing 2D, 3D, or other complex meshing for vias, contact pads, device instances, selected nets and/or other structures. Techniques can be applied for reassessing impact of structural redesign, and reports and/or visualization can be generated, each enhanced by the use of heterogeneous meshing.

20 Claims, 8 Drawing Sheets

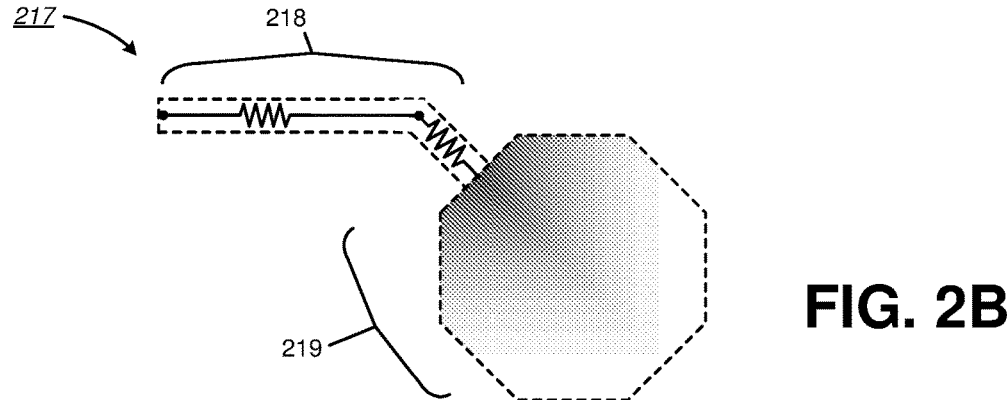
FIG. 2B
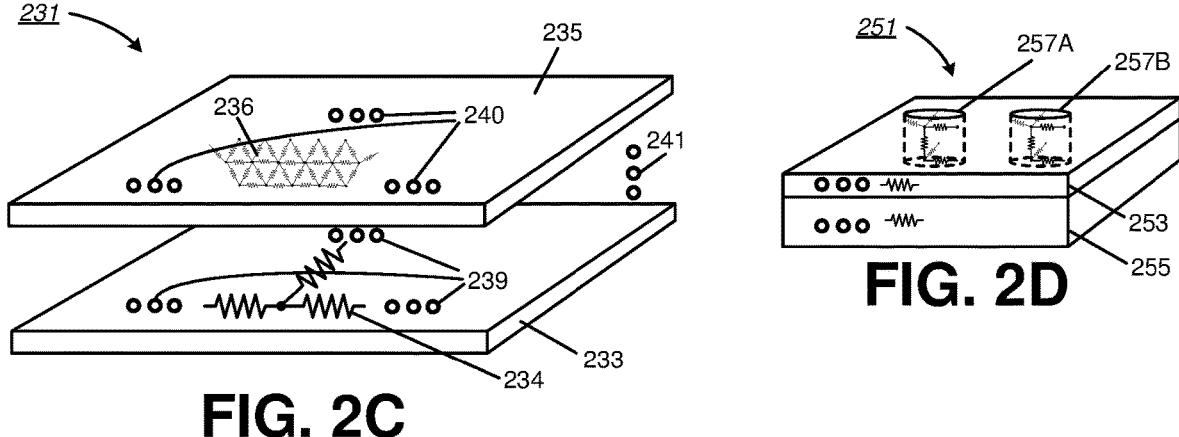
FIG. 2C
FIG. 2D
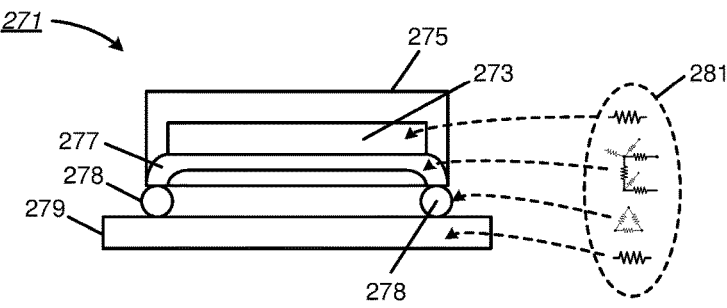
FIG. 2E

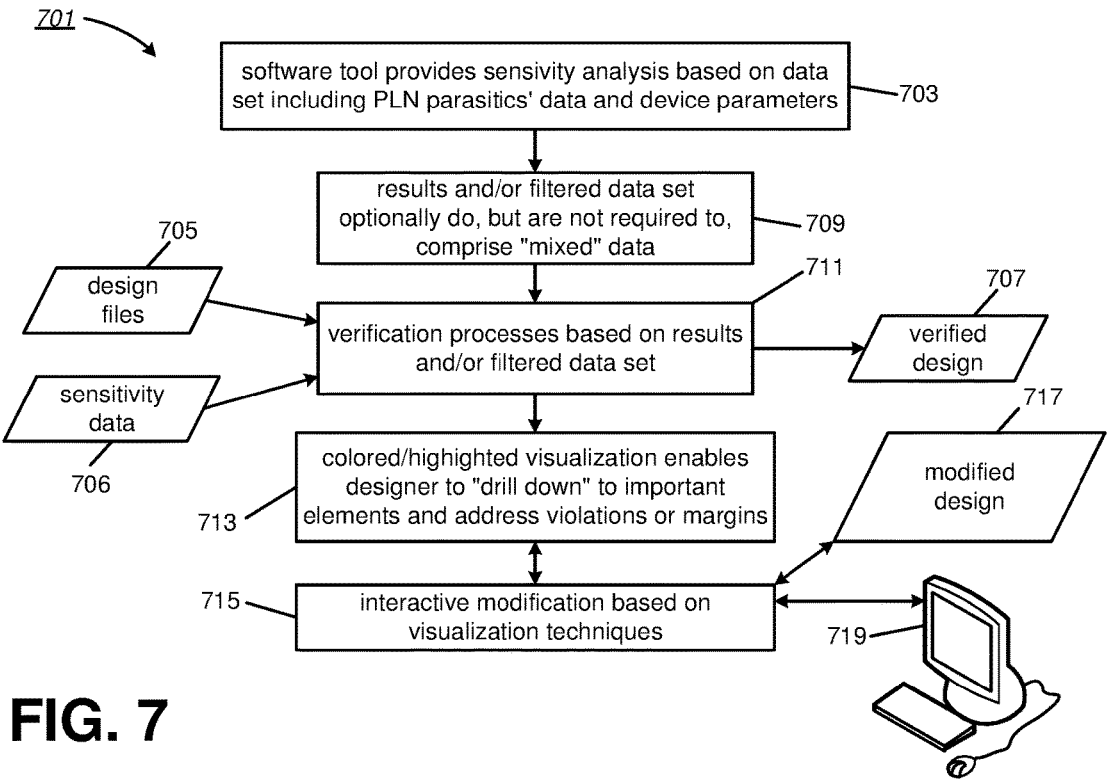

_701_ software tool provides sensivity analysis based on data set including PLN parasitics' data and device parameters ~703

705 design files sensitivity data

706 results and/or filtered data set optionally do, but are not required to, comprise "mixed" data ~709

711 verification processes based on results and/or filtered data set

707 verified design

717 colored/highighted visualization enables designer to "drill down" to important elements and address violations or margins

713 modified design

715 interactive modification based on visualization techniques

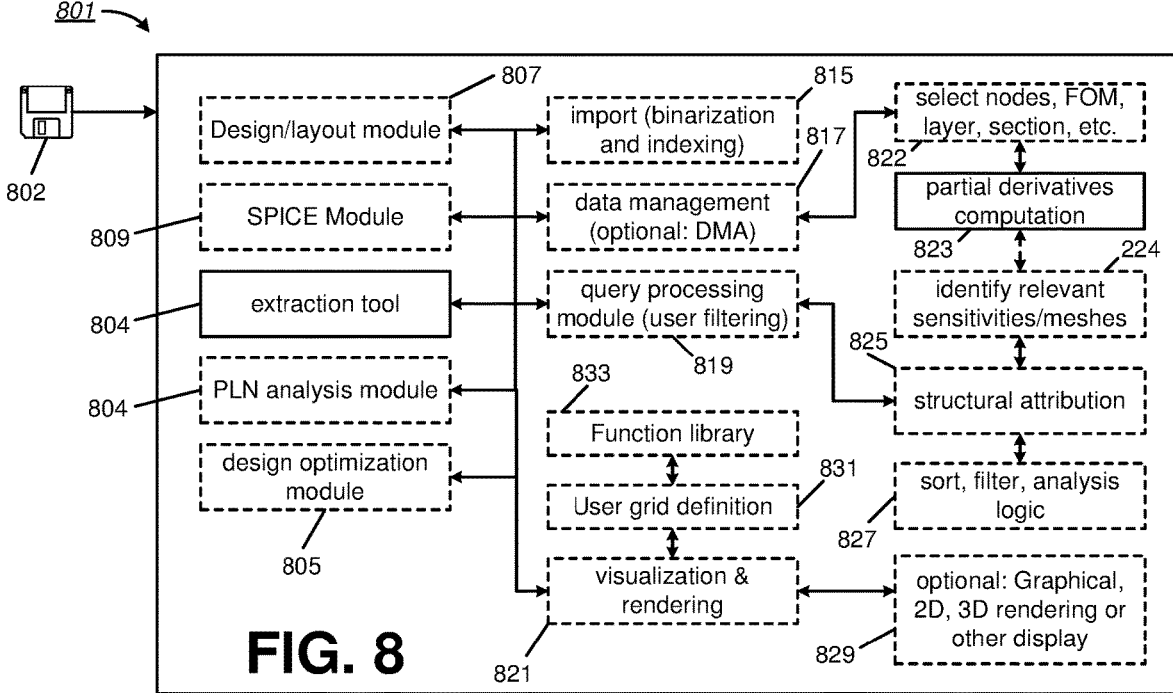

_801_

802

807    Design/layout module

809    SPICE Module 804    extraction tool

804    PLN analysis module 805    design optimization module 807    import (binarization and indexing)

815

817    data management (optional: DMA)

query processing module (user filtering)

833    Function library

819

831    User grid definition 821    visualization & rendering select nodes, FOM, layer, section, etc.    815

822    partial derivatives computation    817

823    224    identify relevant sensitivities/meshes 825    structural attribution 827    sort, filter, analysis logic

831

829    optional: Graphical, 2D, 3D rendering or other display

FIG. 8

EXTRACTION BASED ON HETEROGENEOUS MESHING TECHNIQUES

CROSS-REFERENCE TO RELATED APPLICATIONS

This disclosure claims the benefit of U.S. Provisional Patent Application No. 63/312,053, filed on behalf of first-named inventor Maxim Ershov on Feb. 20, 2022. Each aforementioned provisional or other patent application is hereby incorporated by reference.

FIELD

The subject matter of this disclosure relates to electronic design automation ("EDA") tools for integrated circuit ("IC") design.

INTRODUCTION

Parasitic extraction is a standard step in integrated circuit ("IC") design flow. Parasitic extraction calculates unintended or parasitic elements caused by IC layouts, and generates a post-layout netlist ("PLN"). Most often, parasitic extraction is done in RC mode, i.e., parasitic resistances and coupling capacitances are calculated, while other elements, such as inductances, are ignored. Parasitic resistances, in particular, are generated by fracturing the metal lines or metal shapes of an IC layout into smaller pieces, assigning a single one dimensional ("1D") resistance value to each fragmented structure; this is to say, each structure is typically modeled as having a parasitic resistance spanning one dimension with all other dimensions (e.g., height and/or width, as appropriate) modeled as having uniform current density. Citing a specific example, as part of this process, metals lines can be broken up into two dimensional ("2D") shapes (e.g., "subnets") by breaking the overall metal line lengthwise at certain points—such as at connections to vias, metal bends, ports, instance pins, and at additional points— to keep fracture length within a specified range. Each fractured element is then modeled as having a uniform parasitic resistance along structure length, with a uniform current density across other dimensions (e.g., thickness and/or width). The resistance is usually calculated according to a classical formula, $$R = Q \cdot L/W,$$

where Q is the sheet resistance of a metal layer, L is the length of the fracture, and W is the width of the fracture in question.

Parasitic extraction software tools exploit this 1D approximation process to perform resistance extraction. When it is considered that a typical layout can feature many thousands of lines or polygons, with many hundreds of thousands-to-billions of parasitic elements (even with 1D approximation), it should be understood that this 1D approximation process is, practically speaking, a requirement in order to produce PLN file sizes that can be managed, stored, loaded and otherwise processed.

However, in some instances, this approximation can result in loss of needed detail. For example, in many integration designs, one or several top metal and via layers may have very complex, 2D or even 3D, shapes. Using 1D resistance extraction for such shapes is highly inaccurate, providing unreliable results that might not accurately characterize performance of the integration design at issue. Such situations often happen in power management technologies and associated integration designs, in power nets (e.g., with power devices, such as with certain transistor types), in ESD protection networks, in top metal layers which define connection pads, in connection with non-Manhattan routing, in redistribution layers (RDLs), in packaging layers, and in other systems/designs where the resistance of the conducting paths should be very low—of the order of 1 Ohm or less. It should be appreciated that these are non-limiting examples.

What is needed is a set of techniques for addressing these problems. Ideally, such techniques would automatically operate in software as a part of (or concert with) EDA tools, and would permit extraction of manageable PLN file sizes and/or efficient meshing practices, but without loss of detail needed for accurate simulation. Ideally, such techniques would be applicable to those environments just mentioned above. The present invention addresses these needs and provides further, related advantages.

BRIEF DESCRIPTION OF THE DRAWINGS

FIG. 2B shows heterogeneous meshing of and/or parasitic extraction for the shape 141 from FIG. 1C.

FIG. 2C shows another example of heterogeneous meshing and/or extraction, e.g., where first meshing (e.g., 1D meshing) is effectively applied to a first layer and where second meshing (e.g., 2D meshing, optionally at a different granularity) is applied to a second layer.

FIG. 2D shows another example of heterogeneous meshing, applied on a structural basis-3D meshing and/or other complex meshing is used for vias 253, while default meshing (e.g., 1D meshing, optionally applied at coarser granularity) is generally applied to the depicted structural layers.

FIG. 2E shows another example of heterogeneous meshing, but this time, applied in a manner where meshing is also performed for one or more other structures, such as a packaging layer, an interconnection of some sort, or a layer of an interconnected structure (e.g., one or more layers of a printed circuit board or stacked, second die).

FIG. 7 is a flow chart showing actions performed by one or more software tools, in one embodiment.

FIG. 8 is a block diagram showing components and/or modules of an electronic design automation (EDA) system.

FIG. 9 is used to illustrate one possible application of techniques provided by this disclosure.

Figures 1A, 1B, 1C, 2A:
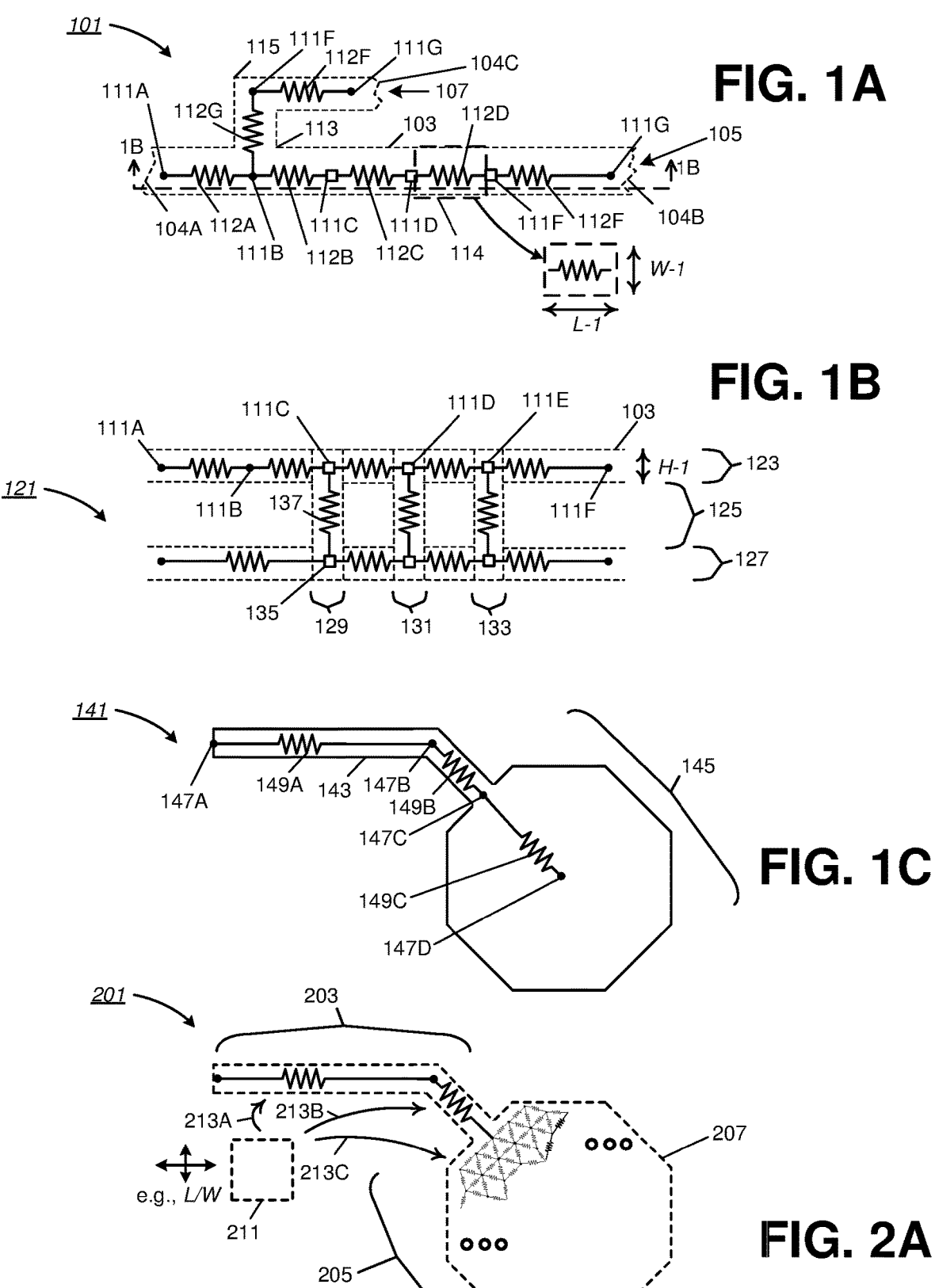
FIG. 1A shows a plan view of a hypothetical example of breaking an electrical pathway up into a set of parasitic resistances during extraction and/or using 1D meshing.
FIG. 1B. is a vertical cross-section, or slice, of the design seen in FIG. 1A.
FIG. 1C shows an example of a relatively complex shape 141.
FIG. 2A shows heterogeneous meshing of and/or parasitic extraction for the shape 141 from FIG. 1C.

The subject matter defined by the enumerated claims may be better understood by referring to the following detailed description, which should be read in conjunction with the accompanying drawings. This description of one or more particular embodiments, set out below to enable one to build and use various implementations of the technology set forth by the claims, is not intended to limit the enumerated claims, but to exemplify their application. Without limiting the foregoing, this disclosure provides several different examples of techniques that can be used to improve the functioning of automated or computer-assisted circuit design, analysis and/or layout tools, and to speed up effective circuit design and debugging. The various techniques can be embodied as software, in the form of a computer, device, service, cloud service, system or other device or apparatus, in the form of a circuit design or layout file produced or modified as a result of these techniques, or in another manner. While specific examples are presented, the principles described herein may also be applied to other methods, devices, and systems as well.

DETAILED DESCRIPTION

This disclosure provides techniques for addressing the aforementioned problems. In one embodiment, extraction of an integrated circuit ("IC") design is performed to produce parasitics representing the particular way that IC design is laid-out. This extraction can be performed by an electronic design automation ("EDA") or other software tool, or machine having such a tool, in a manner that assists an ID designer with designing, analyzing, simulating, or otherwise interacting with, the information defining an IC layout. In another example, techniques provided by this disclosure can instead (or in addition) be embodied in a downstream software tool, for example, that receives an already-generated post-layout netlist ("PLN"), and which operates on, modifies and/or expands that netlist. As an example, heterogeneous meshing can be performed during simulation where first meshing practices are applied to a first set of shapes, layers, structures, areas, etc., and second meshing practices are provided to a second set of shapes, layers, structures, areas, etc. A software tool can be provided as part of a machine, it can be sold, distributed, downloaded, etc., for installation on a machine (e.g., by a software distributor), and/or it can be made available as a cloud or other service. In yet another example, techniques provided by this disclosure can be embodied in a data structure stored on a physical storage medium which defines an IC layout generated with the assistance of the techniques described herein. Other embodiments are also possible.

Embodiments described herein provide heterogeneous extraction and/or other meshing support for purposes of simulation or other analysis, i.e., to assist an integrated circuit designer with the layout process or with analysis of a proposed layout. This is to say, whereas conventional wisdom is that complex meshing is prohibitive, in terms of files size and the number of elements needed to represent an IC design, techniques described herein provide filtering and/or selection of structures, layers, areas, or other portions of a given layout which will benefit from non-default extraction and/or meshing techniques; conventional techniques can be used for the bulk of a given layout, while special scrutiny can be selectively applied to circuits, layers, devices or regions of the IC layout which are of special interest.

The various techniques described herein can be combined with other optional techniques which facilitate and/or enhance generation and or usage of heterogeneous meshing; for example, detailed embodiments described below provide for efficient data management through the use of binarization of PLN files, with use of a locally-stored "index" file to identify selective segments within a much larger binary file, thereby permitting fast loading only of those portions of the PLN file or meshed data needed for purposes of efficient analysis/simulation. Also, or instead, graphical rendering of data can be directly based on the generated (or modified) parasitics and/or mesh data, enabling rapid visualization of accurately-modeled portions of the layout; this rapid visualization, used in tandem with interactive design modification, facilities an intuitive understanding by the design of how design modification improves IC performance parameters, and therefore leads to a faster, more efficient overall design process. When these visualization techniques are combined with heterogeneous meshing techniques described herein, these elements provide powerful tools for robust visualization of IC layouts and associated data, facilitated design/layout modification, and interactive visualization of the effects of design changes, based on parasitics from the PLN file, without requiring full redesign, and without requiring repeated iterations of re-extraction, re-meshing and/or full re-simulation.

Note that by "heterogeneous" meshing, it is meant that two different types of meshing techniques, algorithms, granularities or other different types of meshing are used for a single design and/or a single file representing IC design or layout parameters. "Heterogeneous" meshing includes, but is not limited to, multidimensional meshing, such that, by way of example, one dimensional ("1D") meshing is used in one instance, while two dimensional ("2D") meshing is used in another; naturally, any combination of different dimension numbers are encompassed by this, e.g., three dimensional ("3D") meshing combined with 2D meshing for respective portions of an integration design, and so forth.

A few introductory examples, such as seen in FIGS. 1A-1C, would be beneficially discussed at this point. Each depicted structure is hypothetical in nature and is used to explain challenges in extracting and/or combining parasitics and other data representing a layout of an IC design.

When electronical components are initially designed, that is, in the form of an initial, high-level specification, circuit components and pathways are typically assumed to have ideal values (e.g., zero resistance, capacitance etc.). In a fabricated IC, however, this is never true, i.e., conductors will have non-ideal values that zero resistances, and the proximity of these conductors to other structures (e.g., layers, conductors, and devices) will impart electrical effects that cause signals to slow down, lose amplitude, lose edge definition, exhibit crosstalk or interfering echoes, and experience many other types of effects. These effects are modeled by parasitics and device instance parameters which are identified during extraction process. Digital values representing these things are typically stored as part of a post-layout netlist (PLN) file. Meshing is performed, either in creating a PLN file, or at a later time to analyze resistances, usually for purposes of simulation. Software (e.g., an extraction and/or a simulation tool) typically analyzes the three-dimensional (3D) layout and divides features into shapes (e.g., fractures), which are then modeled as having a one dimensional (1D) resistance and uniform current density, as described earlier. The extracted PLN file provides a "netlist" that lists previously-identified nodes in a design and identifies pair-wise connections that node with each other pertinent node, including parasitics and device instance data; simulation software then operates on this data to use these elements for purposes of simulation. The simulation typically assesses, given assumed signaling parameters, how signals will behave in the design, and how timing, signal skew, edge slew, attenuation, crosstalk, intersymbol inter-
ference, and other parameters associated with signal trans-
mission will affect overall performance.

Note that there are different conventional formats for the
PLN file (e.g., such as the Standard Parasitic Format or
"SPF," the Detailed Standard Parasitic Format, or "DSPF,"
the Standard Parasitic Exchange Format or "SPEF," the
Open Access or "OA" format, extracted view, SPICE netlist,
and other formats); each of these typically provides a format
which models the given layout at a set of nodes which are
interconnected by the individual parasitics or other elements
which are set forth in the PLN file. As introduced earlier,
there can be billions of parasitics needed to represent a
layout of an IC design of any complexity, and most PLN files
are therefore quite unwieldy.

FIG. 1A shows an example of very small portion of a
hypothetical IC, e.g., taken as a horizontal cross-section
(i.e., the FIG. represents a plan view of a single layer,
namely an interconnect layer, e.g., a metal layer). The FIG.
shows a conductive path 101 defined within that intercon-
nect layer. The physical width and length dimensions of the
path are depicted by a dashed outline 103; this outline has
broken ends (e.g., 104A/B/C), indicating that the conductive
path continues off the drawing page at these points. The
conductive path has a straight portion 105 and a branch
portion 107. The interconnect layer will also have a thick-
ness or height, which is not visible in this FIG.

In breaking up the depicted structures, conventional soft-
ware might first identify various "nets" (such as a first "net"
extending from node 111B to the left, a second "net"
associated with the straight portion 105 to the right of that
node, and a third "net" representing the branch portion 107).
These demarcations are non-limiting examples only. Soft-
ware would then break these nets into smaller structures
(e.g., fractures or subnets), that is, into smaller 2D or 3D
shapes each having a single resistance value corresponding
to one dimension (e.g., length, L−1) and uniform current
density across each other dimension (e.g., width, W−1).
Note that these dimensional references are arbitrary, e.g., the
resistance could instead be taken along the width dimension
(such as represented by resistor 112G) or a height dimension
(such as will be shown in FIG. 1B), with other dimensions
having uniform current density. FIG. 1A shows the breaking
up of the overall conductive path into many such structures,
e.g., each corresponding to a single resistor (**112A, 112B,
112C, 112D, 112E, 112F or 112G**), each connecting a pair of
nodes from the various depicted nodes 111A-111B (e.g.,
connecting node 111A with node 111B, node 111B with node
111C, and so forth). A single such fracture, represented by
resistor 112D, is demarked by a bounding box 104 and is
featured in expanded detail in the lower right of the FIG.; the
fracture is seen to have a length "L−1" and a width "W−1"
and to be represented by a single parasitic (e.g., resistor
112D extending between nodes 111D and 111F). In breaking
up the path, software would typically identify sub-nodes
such as shape corners (e.g., 113/115), corner points (e.g.,
111F), connection points (e.g., 111B-F) and other, similar
features, and would also employ rules which specify a
maximum fracture length (or a range of lengths) to be used
for fractures. These rules for example might specify appli-
cation of the bounding box 114 in order to define facture
size. Note that square nodes in this FIG. represent via
connection points.

Generally speaking, the same process and rules are
applied for a given software tool across the entirety of each
layout and/or design at issue; this is to say, the extraction
and/or meshing size granularity is typically consistent throughout the layer and/or layout. Finely granular extrac-
tion and/or meshing is, in theory, possible, but because many
hundreds of thousands to billions of structures typically exist
in IC designs, and because extraction files (e.g., PLN files)
are typically already many gigabytes (e.g., hundreds of
gigabytes)—an unwieldy size even in today's computing
environment-finely granular techniques are generally not
used, and a coarse, consistent approximation is typically
applied, once again, across the entire layer or design.

FIG. 1B represents a vertical slice of FIG. 1A, taken in the
direction of FIG. 1A's arrows 1B-1B. The straight portion is
once again divided into sub-nodes 111A-E, with branch path
107 being occluded from view in this FIG. However, FIG.
1B also shows several layers (e.g., 125 and 127) which were
hidden from view in FIG. 1A by a topmost layer 123. FIG.
1B shows that each of the layers 123, 125, 127 has a
thickness associated with it (e.g., height H−1 in the case of
layer 123). The various structures are once again modeled
for purposes of meshing as 1D structures, at generally
consistent division granularity; that is to say, topmost and
bottommost layers 123 and 127 are modeled as fractures or
elements of constant resistance between node points, and
with uniform current density across other dimensions (e.g.,
height and width, in this example). The vias (i.e., square
node points 111C/D/E), are now seen as having widths **129,
131 and 133, and to connect the topmost layer 123** with the
bottommost layer 127 (i.e., square sub-node 135 marks
where a via connects to the bottom layer). As depicted, in a
1D approximation, each of the vias are also broken into
fractures/elements represented by a single resistance, this
time along the height dimension, such as referenced by
numeral 137, with uniform current density across other
dimensions).

While generally useful for modeling simple structures,
including many conductive path/conductive trace imple-
mentations, these techniques can result in loss of needed
detail. For example, in many integration designs, one or
several top metal and via layers may have very complex, 2D
or even 3D, shapes, and simulation performed on the basis
of 1D meshing might not provide accurate results.

FIG. 1C illustrates a hypothetical example of a complex
shape 141, namely, where a conductive path 143 terminates
in an octagonal bond pad 145. As denoted by resistor
symbols overlying the FIG. (e.g., 149A-C), meshing is
typically applied by software, e.g., during a function call, on
a consistent basis, with the depicted structure being frac-
tured, with connection points (nodes) being defined (e.g.,
147A-147D), and with each structure modeled as having a
resistance value between node pairs and uniform current
density in orthogonal dimensions. However, as noted, using
1D resistance extraction and/or meshing for such shapes
might lead to highly inaccurate results, depending on the
type of analysis being performed. Inaccuracies in modeling
can also lead to ineffective assessment of the effects of
changes of characteristics proposed in the design revision
process or in connection with design optimization.

FIGS. 2A-2D are used to depict some of the general
benefits obtained using various techniques as described by
this disclosure. Note that, in connection with these and the
other FIGS. of this disclosure, sizes and types of structures,
polygons, parasitic or other representation, and exemplified
meshing techniques are simplified for purposes of discus-
sion, and are not intended to be examples of real-world
structures, or true to scale.

FIG. 2A shows an example structure 201 that is similar to
the one seen in FIG. 1C. Once again, the design generally
features a conductive path 203 and a bond pad 205; in the depicted case however, while the conductive path 203 is extracted and/or meshed using conventional 1D techniques, the bond pad 205 is extracted and/or meshed using heterogeneous techniques, e.g., in this case, 2D techniques. There are different ways in which this can be done, but as one example, a bounding box (e.g., 211) may be used to demark structures where 1D techniques will be applied (e.g., at least one structural dimension is smaller than a dimension of bounding box 211) from structures where 2D meshing techniques will be applied (e.g., many nodes are created, with node pairs being connected together by multiple resistance paths). In the depicted case, for example, bounding box 211 might be applied to result in 1D approximations (represented by arrows 213A and 213B) for the conductive path/depicted metal line, but with a 2D approximation for the bond pad 205 (i.e., represented by arrow 213C). Note that a graphic 207, seen within the area of the bond pad 205, represents this complex extraction/meshing at a symbolic level only. This is to say, while the graphic denotes many sub-nodes, in fact, not all forms of complex parasitics representation/meshing are necessarily represented as pairwise sub-node connections; for example, it is possible to express 2D or 3D meshing using gradients or 1D, 2D or 3D polynomials, or in another nontraditional manner, as non-limiting examples. Note also the demarcation described above can also optionally be nested, with three or more different types of meshing techniques being performed (e.g., 2D and 3D for respective objects, on a basis that includes 1D meshing for other objects), based on respective rules or filters.

FIG. 2B provides an example, denoted by numeral 217, where heterogeneous techniques are applied, e.g., using 1D meshing for conductive path portion 218 and using a gradient for meshing of a bond pad portion 219. The selection of the type of meshing to be applied, and granularity of demarcation, if any, and/or dynamic selection of structures, nets, regions, etc., and whether rules for demarcation are dynamic or fixed, are within the level of ordinary skill of an IC designer. For example, applications requiring very accurate analysis might call for the use of much more accurate extraction and/or meshing than applications based on the same structure(s), for purposes of simulating different parameters.

Reflecting on some or all of these options, it should be understood that embodiments described herein apply different meshing techniques for certain elements of a layout, while continuing to apply conventional 1D techniques for other elements of the layout. The way in which this differentiation occurs can be different in different embodiments, and/or specified by software or rule. In a first example, portions of a design can be differentiated based on structural-identifier (ID), layer, geographic region or area, by net, device, structure type, and/or by other forms of demarcation, with a meshing subroutine being provided with an argument to identify the type of meshing to be performed. In a variation, instead of being performed during extraction, downstream software (e.g., simulation software) can receive a PLN which has already been generally subject to extraction using conventional (e.g., 1D) techniques, and can invoke a subroutine as needed to re-extract and/or apply heterogeneous meshing techniques to specific, selected layers, nets, structures or regions of a layout, etc. In another variation, different extraction and/or meshing subroutines can be invoked according to the type of simulation desired, with simulation software (or the designer) selecting the type of meshing to be applied, and executing a subroutine dedicated to complex (e.g., 2D or 3D) meshing for select elements of the layout only. In yet another embodiment, a library (or database) of complex extraction data and/or meshes can be stored, with a structure type first being identified (e.g., a specific layer or specific device type), with 1D techniques being applied to elements of a design which do not match the identified type, and with precomputed and/or different techniques being supplied from the library (or database) for those structures/elements which do match the identified type. In still another embodiment, 1D techniques are first used to generate data for a layout (e.g., all, or part thereof, such as, by way of example, a specific layer), with a designer on a downstream basis then manually selecting specific structures, layers, devices, etc., as targeted structures which are to receive different extraction and/or different meshing. Note that, as indicated, in some of these latter embodiments, common meshing techniques can be applied across a layer (e.g., or a layout or any portion thereof, e.g., a net), while heterogeneous meshing can be applied to select structures within that same layer, design, net, etc., on a latent basis. In still another embodiment, the granularity used to demark structures for heterogeneous meshing can be varied, once again, according to structure ID, layer, area, device, structure type, etc.

Note that additional embodiments will be described below where meshing is also optionally performed for interconnects (e.g., wire leads or solder bumps), one or more packaging layers (e.g., a lead frame or other mounting structure), and/or one or more layers of another structure such as a PCB or second die, e.g., that is to be in a stacked configuration with the die/IC which is under design; heterogeneous meshing can also be applied across these demarcations below, e.g., as necessary to assist with the simulation and/or assessment of the IC which is under design. Heterogeneous meshing data that includes a representation of these other structures can optionally be stored as part of a single, aggregate PLN file, or as one or more collateral files.

FIGS. 2C, 2D and 2D provide further exemplification of some of the options and capabilities described above. More particularly, FIG. 2C shows a 3D depiction 231 of a layout where a first layer 233 of an IC is overlayed by a graphic 234; this graphic 234 symbolically denotes the default application of conventional, 1D techniques to the first layer 233. FIG. 2C also shows a second layer 235, which is overlayed by a second graphic 236; this second graphic symbolically denotes that some different type of meshing is applied, e.g., 2D meshing, as symbolically represented. Ellipses 239 and 240 denote that, in this example, meshing technique is consistent throughout each respective layer 233 or 235, but is heterogeneous across layers. Ellipses 241 denote that there can be many more than two layers, with the same or other extraction/meshing techniques applied for other layers. FIG. 2D is similar, in that it also shows a 3D depiction 251 of a layout having different meshing, but here, demarcation is structure-based (or net-based); for example, a resistor icon in each of layers 253 and 255 denotes that default, 1D meshing techniques is applied within each of these layers, while graphics within shapes 257A/B denote that more complex/different techniques are applied for certain structures, e.g., 3D meshing in this case. For example, shapes 257A and 257B in this example might represent vias that extend between layers (or nets corresponding to a cross-layer connection). FIG. 2E shows a structure 271 having a die (an IC under design 273), encapsulation 275, one or more internal packaging structures/layers, such as a depicted lead frame 277, electrical interconnections (represented figuratively by solder bumps 278) and an underlying structure 279 (which might be a PCB or second IC/die. As depicted by graphics 281, heterogeneous meshing can be applied also across some or all of these boundaries, with resultant resistance meshing data being stored in one or more files for purposes of simulation/analysis. The heterogeneous techniques applied to represent the different subsets of the layout can include 2D meshing, 3D meshing, or another form of meshing which differs from the default case.

Before proceeding further, several further terms as used herein should be defined and/or introduced. First, an "integrated circuit" as used herein refers generally to a die, packaged or unpackaged; generally speaking, actions of a designer as used herein are usually directed to layout and optimizing performance of a die. However, for some embodiments, information for other dies, a printed circuit board, electrical interconnects and/or other information can also be accessed and factored into the design process for the die (or integrated circuit) under consideration. As this discussion implies, the results of heterogeneous meshing techniques can be stored in one or more output files and used for analysis, in accordance with the techniques discussed herein. "Circuitry" can refer to analog or digital electronic elements (e.g., dedicated logic gates), either arranged as special purpose circuitry that necessarily performs a certain function when electrically motivated, or as general-purpose circuitry (e.g., one or more processors) that are controlled or otherwise configured by instructions (software) so as to adapt that circuitry to perform a specific function and to cause that circuitry to operate as though it was special purpose circuitry. "Processor" as used herein refers to a set of configurable hardware circuit elements or hardware circuit elements that can be controlled to perform any one of a number of different functions including, without limitation, an FPGA, microprocessor, microcontroller, etc., whether or not embodied in a standalone die or as a discrete integrated circuit; a die can optionally have one or more than one processor. "Instructions" and "software" typically refer to instructional logic for configuring and/or ultimately controlling operation of a processor. Such instructions are typically written or designed in a manner that has certain architectural features such that, when those instructions are ultimately executed, they cause, directly or through other software, the one or more general purpose circuits or hardware devices (e.g., one or more processors) to necessarily perform certain described tasks. Generally speaking, reference will be made herein to instructional logic (such as computer code) that, "when executed," directly or indirectly cause one or more processors to perform a specific task; this usage should be interpreted as referring to the intended design and operation capabilities of software (e.g., such as might, following software sale and/or distribution, be installed and/or executed by a software licensee and/or an end-user). Similarly, reference will be made in this disclosure to software performing or taking certain steps, and such should be understood to describe situations where software, as ordered or scripted, once executed, directly or indirectly causes one or more processor-based systems ("one or more processors") to take actions, perhaps using internal circuitry and perhaps using/controlling connected integrated circuits and other devices. "Logic" as used herein can refer to software logic (i.e., instructional logic) or hardware logic (e.g., a digital chip or board design) or a combination of these things. "Non-transitory machine-readable medium," "storage medium," "computer-readable medium" and "physical medium" as used herein, mean any tangible (i.e., physical) storage medium, irrespective of the specific technology used to express how data on is stored on that physical medium, for example, using optical technology, magnetic technology, resistive technology, and so forth; such physical media can include, without limitation, random access memory, hard disk memory, jump drive, solid state disk (SSD), optical memory, a floppy disk, digital video disk (DVD), compact disk (CD), server storage, volatile memory, memory card and/or other tangible mechanisms where instructions may subsequently be retrieved by a machine (such as one or more processors). Each function mentioned in the disclosure or FIGS. can be implemented as part of a combined program or as a standalone software module (i.e., an invocable or callable program or subroutine), either stored together on a single media expression (e.g., single floppy disk) or on multiple, separate storage devices, or in the form of dedicated circuitry or circuitry combined with such software. Throughout this disclosure, various processes will be described, any of which can generally be implemented as instructional logic (e.g., as instructions stored on non-transitory machine-readable media), as hardware logic, or as a combination of these things, depending on embodiment or specific design. A circuit design, or schematic, as used herein generally refers to a generalized description of how component structures in an electronic circuit should be connected together. In the process of circuit design, a schematic is then laid out in a manner such that two-dimensional (2D) pathways are geometrically positioned relative to one-another (i.e., in terms of where they will lie within an actual integrated circuit). A circuit description is then extracted as a netlist which considers precise materials, dielectrics, dimensioning, and other factors, and models the entire circuit design as a netlist, i.e., a list of connected nets. A "net" is simply a set of electrically-connected structures or electromagnetic relationships between structures, and a netlist is a text file that lists the various nets of an electronic circuit, or portion thereof, including associated structural and parasitic information, describes how they are connected to intended circuit components, and so on. A "node" as used herein refers to any type of specified "point" in a circuit design (e.g., whether or not such serves as a junction between two elements or signal paths). A "structure" as used herein, when referring to part of an integration or integrated circuit design, refers to a section or region or logical structure, as well as to discrete physical elements of the design, such as a layer, polygon, device, part of device, route, via, and so forth. "Module" as used herein refers to a structure dedicated to a specific function; for example, a "first module" to perform a first specific function and a "second module" to perform a second specific function, when used in the context of instructions (e.g., computer code), refer to mutually-exclusive code sets; these code sets can be embodied as different code portions (e.g., different sets of lines in a common-program) or respective standalone routines, programs, or files. When used in the context of mechanical or electromechanical structures (e.g., a "sensor module"), the term 'module' can refer to a dedicated set of components which might include hardware as well as software); for example, an "encryption module" and a "network registration module" would refer to dedicated, mutually exclusive components for performing tasks of encryption and network registration, respectively, and they might be discrete code sets or have discrete mechanical structures, or both, depending on context. Note that different modules can still call on a common object, a common reference, a commonly-accessed file, or other shared reference, as long as the different modules' constituent operation-scripting elements are mutually-exclusive to one another. In all cases, the term "module" is used to refer to a specific structure for performing a function or operation that would be understood by one of ordinary skill in the art to which the subject matter pertains as a conventional structure used in the specific art (e.g., as a software module or hardware module as those terms would be understood in the context of computer and/or software engineering and/or circuit integration), and not as a generic placeholder or "means" for "any structure whatsoever" (e.g., "a team of oxen") for performing a recited function (e.g., "encryption of a signal"). "Electronic" when used to refer to a method of communication can also include audible, optical, or other communication functions, e.g., in one embodiment, electronic transmission can encompass optical transmission of information (e.g., via an imaged, 2D bar code), which is digitized by a camera or sensor array, converted to an electronic digital signal, and then exchanged electronically. "Display image" or "visualization" as used herein generally refers to data or instructions that is formatted so as to collectively represent multiple items or multiple sets of data, e.g., that can be presented together for evaluation or comparison a human user, whether or not such display occurs immediately or at a later point in time, and whether or not such data or instructions are later combined with other data or form only part of a final aggregate image; for example, these terms can encompass a formatted table, as a picture, and so forth. By way of nonlimiting example, a list or an array of values that is formatted such that it can simply be provided to a computer monitor and displayed as-is for rasterization or display according to scripting (e.g., HTML) would constitute a "display image." "Emboldening," "shading," or "highlighting," when used in the context of structures or features that are to be displayed, refers to visually emphasizing such structures or features by any means (e.g., shading, brightness modification, brightness variation frequency, fill pattern, flash pattern, color, or other means); as an example, a "Boolean" indication which simply identifies one structure as significant relative to other structures would represent "emboldening" or "highlighting." "Colored," "colorized," and similar terms refer to emphasis that indicates relative degrees, for example, displaying one structure with variable brightness or hue where the degree of brightness relative to other structures indicates multiple degrees of differentiation, irrespective of whether, e.g., "red," "green" or "blue" color is specifically used. "Performance impact ranking," or "PIR," will be used to refer to any listing, ordering, or other reference that identifies relative contribution to a figure of merit ("FOM") which is attributable to a set of one or more parasitics or device characteristics; by way of non-limiting example, PIR can refer to a list that conveys that a relatively greater contribution or importance to a FOM is attributable to a first element than is attributable to a second element, where each element can be an individual parasitic, or a structural element (for example, a wire, a layer, a part of a component, and so forth). "Electronic design automation" or "EDA" refers to electronic design tools, typically software, or machines having software, that are used by designers of integrated circuits to assist with the implementation of designs of integrated circuits. "Designer" as used herein refers to anyone who uses software or some other tool to design and/or simulate and/or otherwise analyze, edit, or review an integration design, e.g., any user of an EDA tool. The described techniques, in one embodiment, can be implemented as software that forms a standalone software package, or a software module adapted for use with such a package, or alternatively is part of a larger EDA software suite (for example, that also includes software to perform circuit design or layout, to perform simulation, analysis or testing of a given integration design, or other types of software). Such software can be provided or distributed in a number of ways, for example, hosted by one or more servers, and accessed via the Internet (e.g., on an account or subscription basis), partially distributed across one or more client machines or distributed for installation and use on such machines and/or can be provided on a service bureau basis, where software is executed by a provider with visualizations and/or modified designs being distributed to one or more clients. "Multidimensional," as used herein, means in or using multiple dimensions, e.g., the term includes two-dimensional, three-dimensional, as well as any greater number of dimensions; elaborating, when used in the context of resistance meshing, the term "one-dimensional" means that an object, e.g., such as a polygon, net, subnet, layer, and/or other portion of a design is represented as having a resistance along one axis, and uniform current density along at least one other axis, while the term "two-dimensional" means that an object has a resistance gradient across two dimensions.

Note that this document may incorporate by reference other documents, including without limitation, articles, patents, and patent applications; the definitions of this document however, predominate, meaning that in the event of usage of a term in this document of a term which is inconsistent with terminology from an incorporated by reference document, the meaning and interpretation of that term as described/used by this document is to govern.

With the principal parts of this document thus being introduced, this description will now proceed to a more detailed narration of examples provided by a number of specific embodiments.

In accordance with techniques described in this disclosure, heterogeneous extraction and/or meshing techniques are applied to facilitate more accurate analysis of an IC layout during simulation, verification and associated analysis, and otherwise to generate any or all of a PLN file, a file representing meshed data based on parasitics and/or device instances, a file represent meshing data for one or more related structures (e.g., packaging, interconnects, PCB, stacked die, and so forth), a report based on any or all of this information, or associated simulation analysis, and/or a revised layout. Application of these techniques provides for more effective vetting of a given layout, which can then be applied to generate design files for, and to build, ICs/packaged devices that might not have otherwise been built and/or accurately vetted using a conventional design process.

Figure 3:
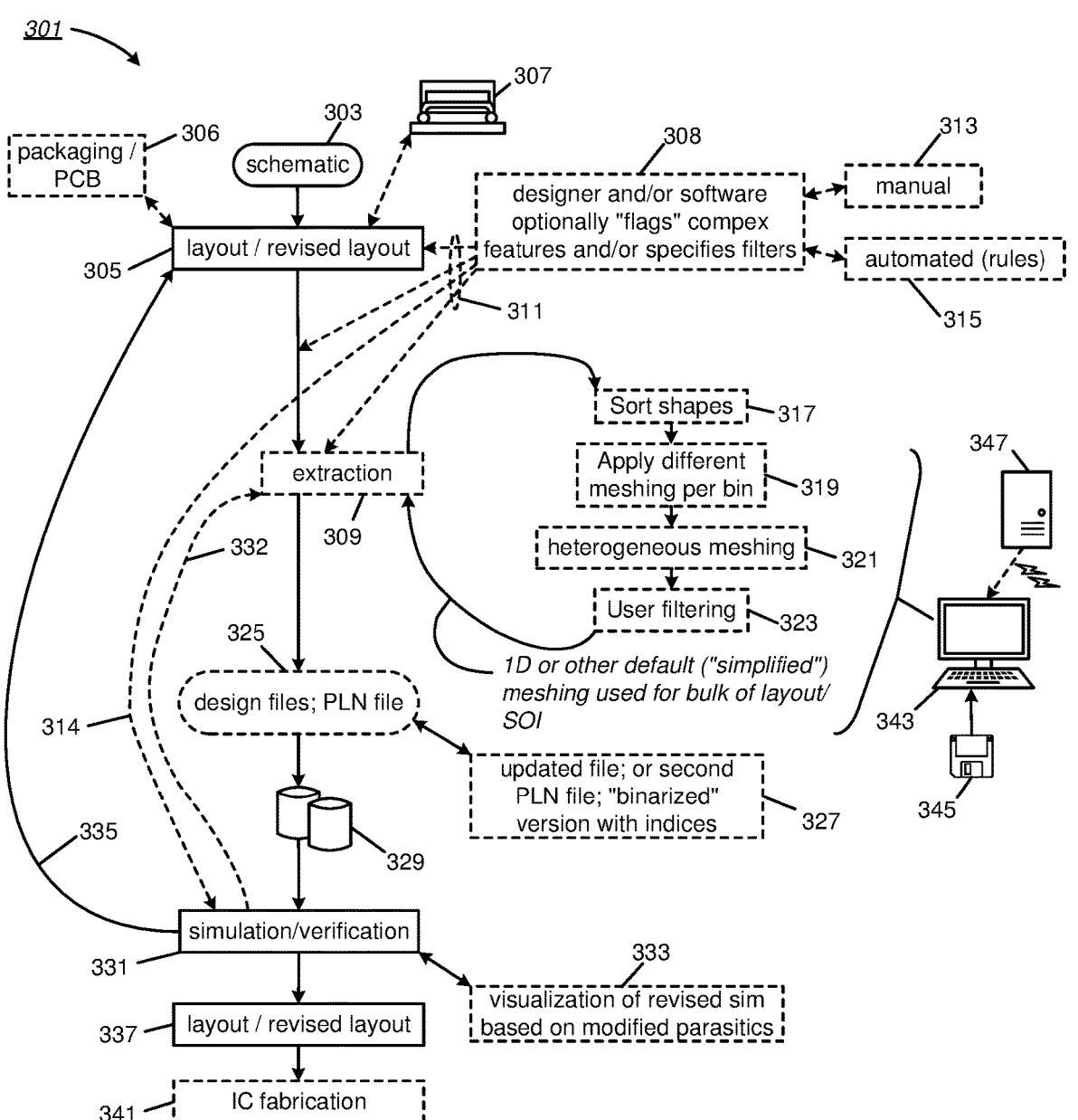
FIG. 3 is a flow chart showing actions performed by one or more software and/or hardware tools, in one embodiment.

FIG. 3 shows an integrated circuit design process, which is collectively referenced by numeral 301.

A designer typically first starts with a schematic 303 (which may have been created by the designer or specified by a third party). The designer, typically seeking to create as small and efficient integrate circuit as possible, uses a software-instantiated "layout tool" to arrange the physical position of devices, and connecting paths (i.e., as part of process 305). In addition, packaging information, interconnection information, and/or information as to layers of a printed circuit board ("PCB") or second die that will be adjacent to or connected to, may also be available, and used as part of the analysis, as indicated by reference numeral 306; this is graphically represented by a graphic of an IC 307, which shows an integrated circuit in the form of a die, mounted on a lead frame, with interconnection to an underlying PCB (or second IC/die). Generally speaking, for the die under consideration, the component level placement within that die and routing can be laid out/arranged in a seemingly infinite number of different ways; as indicated earlier, each different layout will have many non-ideal properties, with some layouts performing better than others. A designer produces a specific layout for an IC design (i.e., a "given" layout), and at this time, as indicated by numeral 309, extraction is typically performed to produce a post-layout netlist ("PLN"). Extraction is illustrated as involving a number of steps 317-323, and results in generation of a PLN file (along with other design files) 325. As indicated earlier, a conventional PLN file will generally feature para-sitics representing typically billions of polygons, as well as device instances. The PLN files are typically stored in some type of mass storage, but they can also be store in main memory depending on project size and system; the use of memory to store these files is generally represented by a database icon, numbered 329, appearing in the FIG.

The given layout is then simulated, using the PLN files, by SPICE software or an equivalent, per numeral 331. In performing simulation, SPICE or other software simulates signal transmission, including cross-talk, echoes, attenua-tion, edge slew and signal skew, and signaling delays, and other performance characteristics, and produces a report that can be used to determine whether the IC design performs according to specification. If simulated performance does not meet or exceed expected parameters, the designer can then attempt redesign (and re-extraction and re-simulation of the revised design) or can start from scratch, as indicated by reference to repeated cycles 335 and revised layout data 337. As an example, if a particular signal in the design is excessively attenuated, or has an edge which lags or is not sufficiently crisp, the designer can attempt to move compo-nents or to otherwise change the layout so as to reduce these effects. Once the layout, as modified, is acceptable, the various design files can then be supplied to a foundry and used to manufacture ICs corresponding to the design, as per numeral 341.

FIG. 3 reflects these various options in its use of a number of different injection points for heterogeneous meshing techniques, as collectively represented by a set of encircled flow arrows 311. For example, per numeral 308, in one embodiment, a designer and/or software can "flag" or des-ignate features of a design, such as for example, pathways, shapes, devices, device types, structure types, polygon types, layers, and/or areas that are to receive enhanced and/or different processing in accordance with the tech-niques of this disclosure. In one embodiment, this designa-tion can be performed manually (e.g., via user interface dynamic interaction with a software tool), while in another embodiment, this designation is performed automatically by software, based on rules or hard coding; these various options are represented by dashed-line boxes 313 and 315 appearing in the FIG. It is also possible to combine auto-matic and manual techniques, e.g., with a software tool selecting proposed structures for non-default extraction/meshing (e.g., the software sorts structures, layers, devices, areas, etc., into "bins"), and with the designer confirming or modifying this selection. The various places in the design flow where these various actions can occur is myriad, depending on embodiment. For example, a first embodiment might be structured such that the designer and/or software flags/designates structures during design for specified pro-cessing during later extraction and/or downstream meshing. There are many examples of how this can be done which will naturally occur to those having skill in the art; to cite a few examples, in one embodiment, software might be designed to automatically invoke special extraction rules and/or meshing for any ESD structure, or based on device instance drawn. In a different embodiment, this designation might be simply an ad hoc decision of the designer during the layout process, e.g., where design software receives an argument (e.g., box checked by the designer) that will cause extraction, post-extraction or simulation software to perform selected and/or non-default meshing for a specific net, layer, structure, or other subset of the layout. It is also possible for this designation to occur during the extraction process itself, or during a later screening process, e.g., by a designer who screens extraction files and selects structures, devices, lay-ers, areas, etc., for extraction, meshing or remeshing, either using conventional 1D techniques, or using one or more non-default/exception techniques. These techniques can also be applied during simulation/verification/layout revision, i.e., as implied by a dashed-line flow arrows 314 and 332 (e.g., respectively leading to and away from function box 331).

Irrespective of whether functions are to be performed prior to, during or after initial extraction, software in this embodiment performs a number of processing tasks, includ-ing sorting of shapes (i.e., structures, devices, layers, areas, etc.) into bins, application of heterogeneous meshing tech-niques depending on bin, and generally speaking, the gen-eration of a heterogeneous results. These actions are desig-nated by numerals 317, 319 and 321 appearing in the FIG. Optionally, a user is also provided with the option to dynamically screen results, either by viewing generated parasitics in a PLN file directly, or through dynamic visu-alization of meshing data or as to how variation in meshing methodology applied as a whole changes performance; visualization will be further described below, but it should be noted here that, in one embodiment, by performing visualization directly based upon parasitics and/or meshed data (that is, by operating on the parasitics themselves, and providing a human-readable display and/or graphical ren-dering), a designer can in real time see how variation in the meshing techniques and/or design changes associated with meshed-structures affects simulated performance. These actions are referenced by a function box 333 appearing in the FIG. In one embodiment, the visualization is a color-based graphical display, which will also be further discussed below. Finally, as indicated by a text legend appearing in the FIG., the result is that 1D or other simplified data is used for much of the given layout (i.e., in the associated PLN file), or layer, or IC region under scrutiny, while non-default tech-niques are applied to selected structures, devices, layers, areas, etc. As noted earlier, there can be more than two "bins" and respective and/or different types of processing applied to each, if desired. A PLN file, and/or the results of meshing, are then stored in the form of one or more files 325 in the depicted database 329. In one embodiment, this information can be stored as a single PLN file, i.e., a SPEF or DSPF-compliant file, while in another embodiment, mul-tiple files can be stored (e.g., a default 1D file, and a second file with different meshing for selected structures, devices, layers, areas, etc.). In other embodiments, this information can be stored as instructions on physical storage media for fabricating a design, e.g., as represented by function block 337. Other variations will also occur to those having skill in the art.

As referenced by numeral 327, in one embodiment, binarization techniques are optionally used to store large PLN and/or parasitics files in a mass storage, main memory or remote storage location, with a local index identifying nodes, structures, devices, etc., being loaded into a work-station's local memory (e.g., random access memory, or "RAM") and used as an operating reference. When a designer and/or software is to analyze a specific portion of the layout, pertinent indices from a local memory indices file are used to identify just those portions of the larger, binary PLN file and/or parasitics information which are needed immediately for processing, i.e., and to extract a small binary portion only of the overall PLN file; this process further minimizes the need for time-consuming load and manipulation of massive file sizes. Any modified or additional data can be used to overwrite the binary file in mass storage/main memory/remote storage, or to create a second file or "delta-file" (e.g., a file representing just updated structures). These actions are more fully described in our commonly-owned U.S. Pat. No. 10,762,259, which is hereby incorporated by reference.

Finally, numerals 343, 345 and 347 denote that the techniques described herein can be embodied as software, that is, as instructional logic stored on a physical storage medium, as conceptually and symbolically represented by a "floppy-disk" icon 345, with numerals 343 and 347 referring to associated machines. This instructional logic causes one or more machines, such as machine 343 (typically each a computer), to perform some or all various actions as described herein, and to dynamically interact with a designer/user, as necessary. As indicated by the presence of a server 347, some or all of these techniques may be remotely hosted, i.e., provided to machine 343 as part of a cloud service or with some of the techniques described herein being stored and/or processed via a local area network ("LAN") or wide area network ("WAN"), as conceptually represented by a dashed-line arrow and "lightning-bolt" icon, appearing in the FIG. Some or all of the generated design files 325 can also be remotely stored using these structures.

Figure 4:
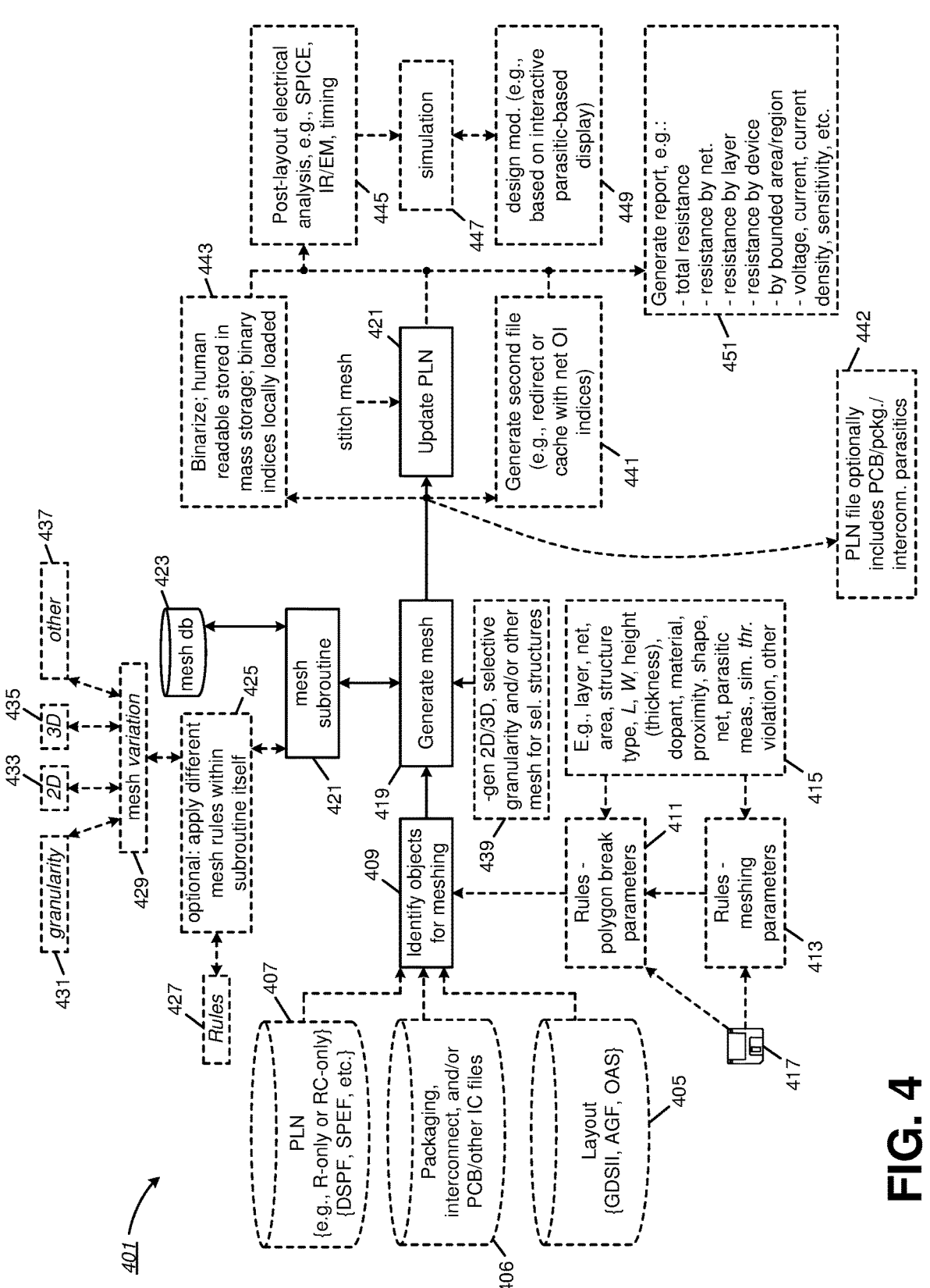
FIG. 4 is a flow chart showing actions performed by one or more software tools, in one embodiment.
Figure 5:
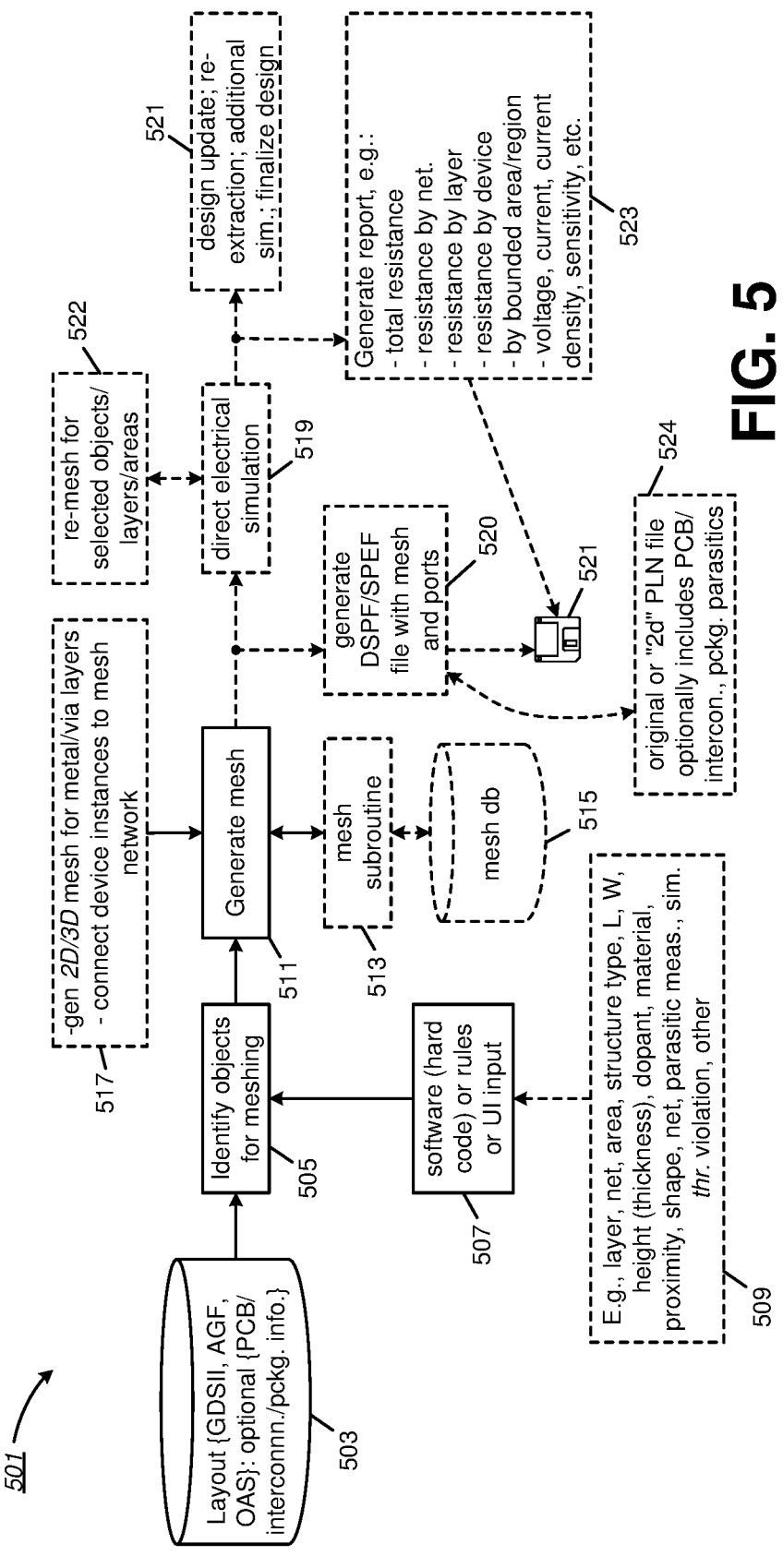
FIG. 5 is a flow chart showing actions performed by one or more software tools, in one embodiment.

FIGS. 4 and 5 are used to describe further detail for some other embodiments. More specifically, FIG. 4 shows an embodiment 401 where a PLN has already been generated, and where meshing (or re-extraction) is performed to generate either an updated PLN file (e.g., as referenced by the text "stitch mesh," appearing in the central part of the FIG.), or a second PLN file, as referenced by numeral 403. FIG. 5 shows an embodiment 501 where a PLN file is not generated a priori, but rather, where extraction of pertinent parameters is performed directly on the layout, as part of electrical simulation. Each of these options will be further discussed below.

As seen in FIG. 4, one or more layout files 405 can be generated by EDA tools on an offline basis and stored for later access, and one or more PLN files 407 can be extracted from the layout file(s), also as an offline process; optionally, if available, design files for packaging, interconnects, PCBs, and/or other adjacent components (e.g., dies) can also be considered if pertinent to analysis of power and/or other parameters of a IC under design, per numeral 406. Generally speaking, the layout files for the IC under design can be in any suitable and/or conventional format, such as in the form of a graphic data system ("GDSII") format or an open artwork interchange standard ("OAS" or "OASIS"). For example, it might be that a designer uses a conventional EDA tools such as available from Cadence Design Systems, AutoCAD, Keysight Technologies, Mentor Graphics (Siemens), Synopsis, or any one of a number of other companies, to create a layout file 405 and/or a PLN file 407. To perform meshing on an efficient basis, an embodiment implementing techniques described herein can operate on these layout files and/or any already-generated PLN files by first identifying objects that are to be meshed, per numeral 409. For example, it might be that a designer wishes to perform current density analysis for a top metal layer of the layout, and accordingly, under the designer's control, an EDA tool (e.g., integrated with one of the EDA tools/vendor products referenced above or supplied independently) selects objects that are pertinent to the modeling and/or simulation to be run (e.g., it identifies structures pertinent to current density analysis in the top metal layer, in this example). In performing this selection, the software employs rules for identifying polygon/fracture break parameters, as per box 411, e.g., the software effectively determines whether parasitic representation from the PLN file is adequate for purposes of the testing/simulation being run. In this regard, the software also employs meshing rules, per reference numeral 413. For example, it might be that for a particular implementation, a designer wishes to implement a first rule where meshing can be 1D where polygons/fractures (and associated parasitics representation in the PLN file) are smaller in at least one dimension than a 2D or 3D bounding box specified by the designer (or by software), and the software advantageously compares the layout with this bounding box to identify cases where this criterion is not met; objects not meeting this criterion (e.g., a hypothetical bond pad, continuing with the example introduced earlier) are then identified and sorted for special processing (i.e., heterogeneous meshing and/or exception meshing). Nearly any type of rule can be used to provide demarcation of structures, layers, regions and/or other subsets of the layout (e.g., generically encompassed by the term "objects") for these purposes, as implied by function block 415. For example, as alluded to by block 415, one or more rules can be applied to perform this sorting. In one embodiment, rules embedded in software program design, while in a different embodiment, rules can be separately generated/scripted, and/or stored, i.e., as symbolically implied by floppy disk icon 417. Based on processing performed, the software then generates a mesh as specified for each selected object per numeral 419; in this embodiment, a mesh subroutine 421 is called to perform special processing of a selected object. In one embodiment, a library or database 423 is consulted to determine whether a meshing template already exists for the identified object. For example, again returning to the examples of FIGS. 2A/2B, it might be that complex meshing has already been calculated for an instance of a specific structure (e.g., the bond pad of FIG. 2A), in which case, the subroutine 421 simply identifies and returns library data (e.g., optionally scaled or adjusted as appropriate). Alternatively, per numeral 425, it is possible to apply different mesh rules within the subroutine itself, e.g., based on a designer-selection of the type of meshing to be provided, based on a rules library 427 (e.g., based on object). As noted earlier, in one embodiment, the type of enhanced meshing to be performed can also be different for different implementations; this is implied by function block 429. For example, in one embodiment, meshing granularity is varied (e.g., the software breaks a given element into much smaller polygons within the design and calculates new parasitics as a function of rules), per box 431. In a different embodiment, 2D or 3D meshing techniques can be selectively employed for respective objects, as respectively indicated by function blocks 433 and 435. As indicated by a box labeled "other" appearing in the FIG., other types of meshing techniques can also be used, per reference numeral 437.

These functions are performed for each object which is identified for special processing, i.e., as identified from function block 409. As referenced by numeral 439, the result is a 2D or 3D mesh, or a mesh of selected type or granularity for certain objects, while such special processing is not performed for other objects for which 1D techniques are adequate (e.g., given the type of simulation to be run).

There are various ways in which the resulting data can be stored and/or used by the designer. First, numeral 403 denotes that, in one embodiment, the PLN file itself is directly updated, for example, by overwriting parasitics information and node information to provide detailed data for selected structures or by specifying a mesh. As a hypothetical example, it is possible to 'break' a net have two or more nodes and associated parasitics/device instances into a much larger collection of "subnets," and in so doing, change either the granularity of meshing or the type of meshing represented by these elements. This is not required for all embodiments, i.e., as implied by numeral 441, in a different embodiment, a second PLN file or a special mesh file can be generated and can be optionally stored/provided to a customer together with an original PLN file 407. Optionally, as referenced by this function box, it is possible to use such a second file as a cache, e.g., if downstream analysis is being performed, simulation (or other) software first looks to the second file for any needed elements and only references the original PLN file 407 where the second file does not have pertinent parasitics and/or mesh data; as this example reflects, in this embodiment, the second file represents only substitute parasitics/device information or mesh information for certain structures that have been marked for special scrutiny. As noted by numeral 442, in one embodiment, meshing information can also be extracted and stored for one or more layers of the PCB or other mounting structure, such as another die in a die stack, interconnection information, and so forth; this can optionally be stored as part of a separate "2d" PLN file (442), or a third PLN file, or meshed data for these elements can be added to the original (e.g., updated) PLN file 421. As represented, objects can be indexed to nets of interest, for example, to perform this type of redirect function. Optionally also, per numeral 443, it is possible to binarize any of the above referenced files, to provide for fast loading and processing of just that data needed for fast processing. Again, this type of binarization is described in the incorporated-by-reference patent (U.S. Pat. No. 10,762,259), and it will also be further discussed below.

As indicated by a dashed-line boxes appearing at the right of the FIG., a number of optional, additional processes can then be performed in conjunction with these techniques. First, as referenced by numeral 445, post-layout electrical analysis can be performed in dependence on heterogeneous processing, as described above. As indicated by numeral 447, this can include simulation (e.g., of electrical signal transmission and/or other characteristics of an IC, e.g., current density in a metal layer). When issues are flagged by simulation or other analysis, this can lead to design modification, per numeral 449. As indicated by text appearing in box 449, this type of design modification is optionally based on and/or enhanced by interactive display/rendering using parasitics and/or mesh information, which will also be described further below.

One embodiment of the present techniques simply produces a report, for example, generated according to rules specified by the software tool. For example, in one embodiment, software can generate predefined reports for the layout as a whole or for subset of that layout, for parameters such as total resistance, resistance by net, resistance by layer, resistance by device, by bounded box, and so forth. In one embodiment, the report provides colored or highlighted visualization, e.g., on a 2D or 3D basis, where colors and/or other graphical emphasis overlies structures to denote absolute or relative values. The conveyed information can also be manifested as a table. Other reports can also be run, for example, for voltage drop, current, current distribution/density, sensitivity of a parameter to an object, and so forth. Whichever report is generated, a file/report produced in accordance with these techniques can be output and/or stored on a physical storage medium, for later use or access.

FIG. 5 shows an embodiment 501 where a PLN file is not generated and/or used as an input, but rather, where techniques described herein are used extract parameters as needed directly from the layout, as defined by one or more layout design files 503. Note that the FIG. once again indicates that packaging, PCB, mounting or adjacent die information can be considered. More particularly, as before, objects are first identified for meshing, as referenced by function block 505. This identification can be performed on the basis of software (e.g., hard coded or predefined rules) or based on designer input from a user-interface, as denoted in connection with function block 507. For example, in one contemplated implementation, a designer can simply select structures, nets, layers or regions of interest using a mouse or cursor, based on a 2D or 3D displayed graphical representation of a layer or portion of the layout under consideration. Alternatively, a different embodiment permits a designer to select layers, nets, structures, or structure types more-generally, e.g., by clicking on a graphical representation of a structure or by selecting a layer, structure or structure type via drop-down menu selection, with software imputing meshing to be applied to a class of structures represented by the selection. Still other embodiments can invoke a filter which is automated, dependent on analysis and/or simulation to be performed. As should be apparent, depending on type of electrical simulation being performed, a variable-type of 1D or other specific (e.g., more complex) meshing might be needed for the same structure, depending on the performance parameter being assessed. Nearly any type of structural demarcation can be effectuated to determine which objects in the layout are to receive conventional and/or differentiated meshing, per block 509. Meshing and/or extraction is then performed, e.g., optionally by invoking a subroutine and/or library files from a mesh database, per numerals 511, 513 and 515. Once these tasks have been performed, as necessary or desired, for all identified objects, a mesh network is then built for all metal layers and/or via layers, and device instances are connected, as necessary or desired for purposes of the simulation being run, per numeral 517. As with other functions discussed herein, these functions can be automated in software and coded as needed to perform these various function. Optionally, the described techniques can be used to generate a PLN file (e.g., a DSPF or SPEF file, as stated by function block 520, with meshing and ports defined as an explicit part of the file format), which is then stored on a physical storage medium 521.

With pertinent parasitic data (and device instance data) being computed and/or connected, the electrical simulation in question can then be directly performed, as indicated by numeral 519. This simulation can result in design update (modification), and optionally, re-extraction and re-simulation until a suitable layout is obtained, per function block 521. In some cases, it may be necessary or prudent to perform re-meshing, per function block 522; for example, if direct electrical simulation identifies a specification requirement that is not met, and the designer still believes that the meshing in question produces too general an approximation, or if layout change is needed, the designer and/or software can invoke further (and optionally, specified) meshing, as indicated by this function block. Finally, as before, a report can be generated according to rules specified by the software tool. This is to say, software can be optionally configured so as to generate predefined reports for the layout as a whole or for subset of that layout for parameters such as total resistance, resistance by net, resistance by layer, resistance by device, by bounded box, and so forth; in one embodiment, the report provides colored or highlighted visualization, e.g., on a 2D or 3D basis where colors and/or other graphical emphasis overlies structures to denote relative value. The conveyed information can also be manifested as a table, and other types of reports 523 can also be run, for example, for voltage drop, current, current distribution/density, sensitivity of a performance parameter to an object, and so forth; once again, these or any of the other results obtained from using the described techniques can be stored on a physical storage medium for optional output or later access. Finally, as indicated by numeral 524, once again, any meshing information for structures outside the die/IC under design, such as for layers of a PCB, adjacent die, interconnect, package, and so forth, can optionally be stored as part of an original PLN file or as a second (or third) such file, for purposes of simulation, graphical rendering and/or report generation.

Figure 6:
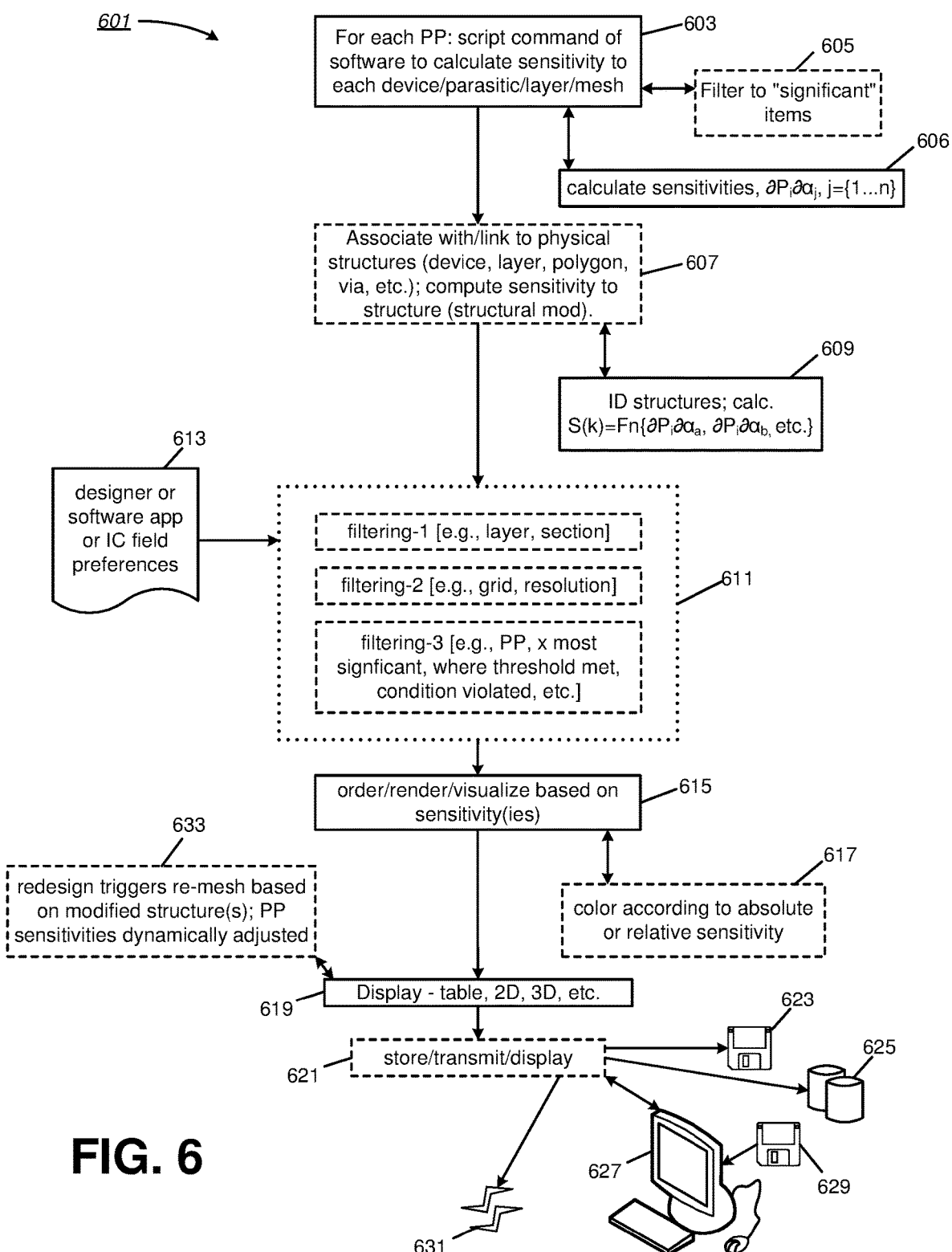
FIG. 6 is a flow chart showing actions performed by one or more software tools, in one embodiment.

FIG. 6 is used to show/discuss optional rendering/visualization techniques 601 for layouts (e.g., or parts of layouts). The techniques can be mixed and matched with any embodiment described herein, and can optionally be embodied in the form of software, as a dedicated machine, or as a generic method.

Per numeral 603, for each identified performance parameter (PP), software calculates sensitivity of that PP to each object which contributes to calculation of that PP (e.g., and/or, to any subset of objects contributing to the PP which are selected by software or the designer). In some embodiments, SPICE or other software need not necessarily calculate an aggregate value of the PP, e.g., it may be sufficient to operate simply on the basis of relative resistances attributed to respective objects, for example. As an example, if a particular PP (such as voltage drop) is dependent on a combination of various parasitic resistances only, it is possible, depending on PP, to calculate sensitivity of the PP to different nets, layers, structures or other "objects" based purely on the relative values of the parasitic resistances. Optionally, those parasitics or meshes which are to be considered can be filtered to use only 'significant' device data and/or parasitics, as indicated by function block 605 (for example structures/elements, which are deemed to negligibly-contribute to the PP being modeled can potentially be dropped or ignored during analysis/simulation). Function box 606 expands on this analysis and sets forth a general notation that sensitivity represents the partial derivative of the PP (P) relative to the individual object (e.g., ai). As indicated by box 607, in one embodiment, computed sensitivities can be processed (e.g., combined or aggregated) to associate them with specific structures represented in the integration design (e.g., nets, bounded geographic regions within the circuit, or physical structures, such polygons, devices or layers). A mathematical operation based on the already computed sensitivities is represented by function block 609. Suitable filtering can then be performed in a manner scripted by software or manually selected by the designer, per numeral 611. For example, a set of preferences can be specified by the designer, by the software application, or otherwise in association with the application intended for the specific integrated circuit whose design is at-issue, per numeral 613. Expanding on the type of filtering that can be applied, as examples, a designer might chooses to filter results to a specific layer or section of the design (e.g., to structures associated with a specific component, segment, or selected region within the integration design); this is conceptually represented by the function block "filtering-1" in the FIG. In some embodiments, a designer can choose to use a "coarsened" approach, i.e., software can be designed to permit a designer to dynamically zoom between large circuit areas (i.e., where averages and/or colors are used to represent many aggregated structures) and individual layers, to identify and address problem areas. Such a zoom ability for example, permits a designer to obtain an overview of problem areas, pertinent to a specific PP, and to quickly zoom in to identify and redress problematic structures or routing. This capability is generally referenced by the function box "filtering-2." As indicated by the function block "filtering-3," a designer or software can also choose to filter by sensitivity or in response to more complex rules—for example, software might be coded to permit a designer to limit display and return of data by software to the "top 5" most important structures (or meshes) from a standpoint of sensitivity of a given PP. Many different types of filtering and sorting of data can be performed, as may be deemed pertinent by those having ordinary skill in the art, or as pertinent to the integration design at issue, and are encompassed by the processing represented by function block 611. Whichever approach is used, software then orders the returned data or otherwise formats that data for visualization, per box 615; as indicated by the FIG., this ordering/formatting is dependent on the calculated sensitivities, either dependent on relative values of those calculated sensitivities or dependent absolute values, and either based on individual structural sensitivities, or blended sensitivities for multiple structures in a design (e.g., an entire layer, or fan out, or other type of structure). Optionally, as indicated by dashed line block 617, coloring can be used to denote different degrees. To cite a hypothetical example of coloring to indicate absolute sensitivity, a "cool" color such as green can be used to denote that the PP is only slightly sensitive a first net and/or structure, whereas a warmer color (e.g., "bright red") can be used to convey high levels of sensitivity. As noted earlier, shading, highlight, flashing or many other different techniques can be used to indicate relative color to a designer. In one embodiment, the coloring can be overlaid over a picture (e.g., 2D, or 3D representation of the integrated design), but this methodology is generally optional. For example, as indicated by block 619, data for display can be stored or visually presented in the form of a table, a two dimensional graphical rendering of a design or a three-dimensional graphical rendering of a design. Per numeral 621, the ordered/formatted data dependent on the calculated sensitivities can then be stored, transmitted, or displayed. For example, the data can be stored in a physical memory device (as denoted by storage icon 623), in a remote database or data center (as denoted by mass storage icon 625) in memory of a computing device (as conceptually represented by numeral 627), or transmitted to a remote location via the Internet or another type of local or wide area network (LAN/WAN), as represented by transmission icons 631. As with other embodiments discussed herein, software embodying the processing techniques discussed above can be provided (locally or remotely) by a physical storage medium 629.

By employing these optional techniques in combination with heterogeneous extraction and/or meshing, described earlier, a more accurate result can be obtained, leading to more accurate simulation/design verification. Employing the graphical techniques described above, e.g., even as a 2D table, with real-time design modification (e.g., graphically initiated by the designer) and associated swapping of substitute parasitics/meshing data, a designer can visualize the effect of design/structural changes in real time, without first performing design file update and associated re-extraction and resimulation of the entire design. Instead, based on manipulation of parasitics and device instance information that tracks designer-implemented shape and device instance changes, and associated remeshing, e.g., as indicated by block 633, the software can rapidly and dynamically obtain performance change data in a manner that can immediately be reflected in a 2D or 3D tabular or other graphical rendering.

An example here might be helpful; assume, for example, that during verification a designer is viewing a display of modeled current density for a redistribution layer where, for example, warm colors and/or other emphasis signifies first structures having high current density and cool colors significant second structures having low current density. Such a graphical rendering permits a designer to intuitively visualize distribution of current density across the rendered structures. If it is further assumed that a designer wishes to interactively modify one of the structures associated with high current density, in real-time, the software (1) dynamically changes parasitics and/or meshing so as to track structural modifications (e.g., width of a conductive trace), (2) recalculates sensitivity of the PP (e.g., current density) to the various structures at play (including the changed structure), and (3) re-colorizes the display rendering so as to depict relative sensitivity of current density over the displayed structures to the characteristics (i.e., parasitics/device instance data, re-meshed as appropriate). The designer, in this hypothetical, is thereby provided with dynamic, interactive data (i.e., real-time re-colorization based on parasitics/device instance change), in a manner that permits the designer to interactively and intuitively understand how each design change affects the PP under consideration—in real time, and based on sensitivity manipulation). Note that in some cases, design changes might imply meshing changes. For example, if an object (e.g., polygon) is resized to a point where it no longer satisfies criteria for 2D meshing, it might be re-meshed using 1D meshing; conversely, if an object (e.g., polygon) is resized to a point where it no longer satisfies criteria for 1D meshing, it might be re-meshed using 2D meshing. And finally, in at least one embodiment, software can be designed to provide the designer with an option, simply by clicking on an object displayed in the visualization, to have that structure re-meshed using complex (e.g., 2D or 3D meshing), with re-colorization and/or value update being dynamically and immediately applied to the display.

Reflecting once again on these principles, it should be appreciated that, when the heterogeneous processing techniques described by this disclosure are used in combination with sensitivity analysis and associated rendering options, the result is a powerful tool that permits a designer to gain an accurate, intuitive understanding as to how individual layout modifications affect IC performance, all without requiring complete redesign and production of a completely new set of layout files and full PLN extraction.

FIG. 7 shows an embodiment generally referenced by numeral 701, and is used to discuss layout modification generally. A computer-implemented method may be used to facilitate interactive design modification of integrated circuits. A software tool provides sensitivity analysis based on data from layout files, specifically, a PLN file 703, and/or using meshed data as described herein. As was discussed in connection with FIG. 6, software can compute, for parameters being simulated, sensitivity of those parameters to individual nets, layers and/or structures or other objects in the layout, i.e., based on heterogeneous meshing techniques; results from this analysis can be filtered as desired, per numeral 709. As indicated by numeral 711, verification can then be performed based on available data files, including design files 705 and sensitivity data 706, to ultimately produce a verified design 707. Per numeral 713, visualization techniques, i.e., predicated on the sensitivity analysis such as discussed above, enable a designer to identify bottlenecks and other problem areas, as well as 'opportunities' for design improvement, and to quickly drill down, or coarsen, visualization to quickly zoom between individual structures and wide area circuit impact. By advantageously re-visualizing (e.g., changing emphasis or color) using modified PLN/meshing data (i.e., without requiring time-consuming resimulation and/or re-extraction), and by providing modified display emphasis dependent on changes, in real time, the present techniques permit a designer to immediately visualize expected effects of changes, once again, locally or globally within the circuit, as indicated by numeral 715. As indicated by function block 717, a designer can use conventional digital devices and user interfaces (719) to dynamically change structures and/or devices and/or their placement, and can immediately and dynamically observe, visually, effects of design modifications on simulated parameters (e.g., based on meshing, remeshing and/or modification of parasitics associated with changed objects). After changes are decided upon, with an expectation that issues have already been redressed by a modified design, the designer can then formally update design files and perform detailed re-extraction and re-simulation, if needed, and as appropriate.

FIG. 8 is a block diagram of one possible embodiment of a computer-based design tool 801 embodying the techniques herein, for example, as optionally integrated with design/layout, place and route (P&R), static timing analysis (STA), SPICE and/or other software modules or tools, such as represented figuratively by a nontransitory/physical media icon 802. Such a design tool can be a comprehensive software package for circuit design or analysis, for example, similar to systems sold by Cadence Design Systems, Inc., Synopsys, Inc., and other similar companies. The depicted system can include a number of different software modules depending on implementation, for example, an extraction tool 803, a PLN analysis module 804 and a design optimization module 805. The extraction tool provides heterogeneous extraction and/or meshing, in a manner that can be customized or varied based on designer (or design) preferences. The PLN analysis module 804 can operate to provide visualization in the manner described above for example, based on sensitivities of a FOM to individual nets, structural elements, device instances, parasitics, and/or sets of meshed data based on parasitics; the visualization can be presented to a designer on a display screen of a computing device, e.g., via a graphical user interface (GUI), and can take the form seen in the incorporated by reference documents, or a different form. The design optimization module 805 can provide for automated or suggested design modification, or designer-assisted design modification, by providing a mechanism for the designer to respond to indicated visualization emphasis and to adjust system/structural element design. The depicted system can also include other (optional) software elements as well, for example, a design/layout module 807 (used to initially and/or manually lay out a design for a given type of electronic circuit), a simulation module (e.g., SPICE module 809, to fully simulate circuit behavior using known techniques, and optionally, to identify contributing nets/structures and simultaneously calculate each pertinent sensitivity).

As indicated by the middle and right parts of FIG. 8, the depicted system can include modules to perform various ones of the functions alluded to or discussed above. For example, an import module 815 can receive a relatively voluminous existing PLN file, mesh data and/or other layout files, and can perform "pre-digesting" of those files (e.g., of a large post-layout netlist file) to create binarized versions and associated indexes (e.g., as described more fully in the incorporated by reference documents). A data manager (data management module 817) can be used to manage access to just those limited portions of the binary file needed for processing, pulling them from main memory into local memory (RAM) when and as necessary, to provide for greatly improved processing speed, and also to script function calls to SPICE software (e.g., calculate sensitivities and PP values). A query processing module 819 permits a designer to manually specify figures of merit, if desired, and/or otherwise identify rule sets and otherwise perform data manipulation and filtering as desired; for example, as indicated by numerals 822, 823, 824 and 825, this module can supply inferred or designer-selected parameters or selection rules to a software routine (823) that identifies a performance parameter (PP), receives (or calculates) digital values representing performance, and identifies individual signals and/or signal paths or other geometries for further scrutiny, and attributes sensitivities to structures within the design (physical or otherwise) for purposes of rendering and analysis. The software calculates the digital values presenting performance from retrieved PLN information/meshed data, for example, by directly calculating or calculating via a subroutine call sensitivity values associated with specific objects, as indicated by numeral 825). The query processing module 819 interacts with the designer to permit the designer to sort, filter and analyze the computed values (or to otherwise apply rules) as may be desired, per numeral 827; for example, displayed structures and/or visual emphasis can be filtered so as to apply onto to a selected range of structures or elements. Per numeral 821, a visualization and rendering module can be used to generate desired visualizations (as depicted in figures discussed below and in the incorporated by reference documents); for example, as indicated by numeral 829, visual emphasis can be overlaid with two-dimensional or three-dimensional designs, or otherwise graphed or charted in a manner that provides meaningful input to the designer. As indicated by numerals 831 and 833, a user grid definition, coupled with a mathematical function library (i.e., with aggregating being effectuated by algorithm selection and/or scripted to apply a specific mathematical function for blending, dependent on the POI) permits visualization to offer different coarseness options (e.g., for pixel, voxel and/or other region granularities, as appropriate to 2D or 3D visualization).

The foregoing description has discussed heterogeneous extraction and meshing techniques that provide for enhanced accuracy in assessing performance of certain types of structures. Not all structures in an integrated circuit design will benefit from application of, or necessarily require, use of heterogeneous techniques as described herein; rather, these techniques are advantageously applied to certain structures which are selected by software or the designer, or are specified by a design file or standard.

Figure 9:
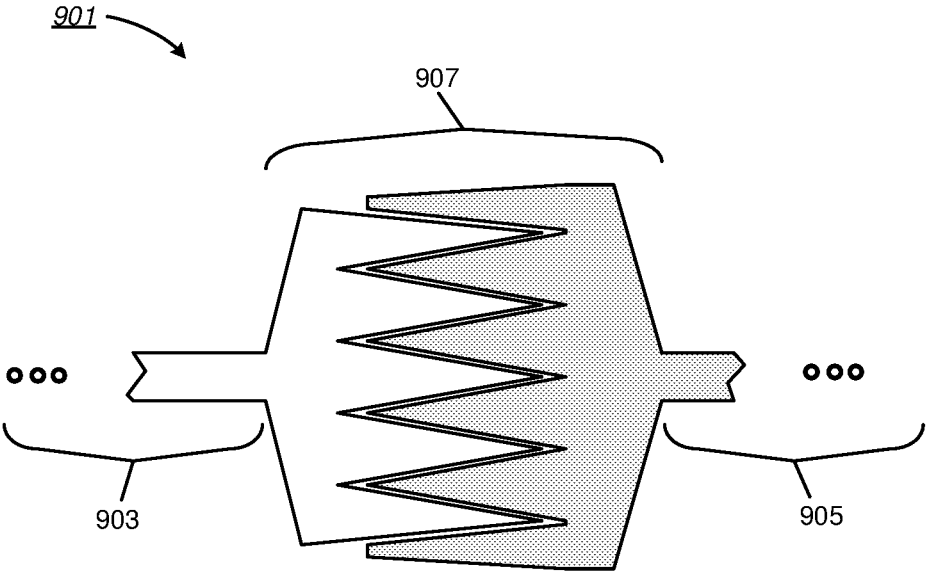
FIG. 9 is a hypothetical structure, e.g., part of a diode, transistor, electrostatic discharge (ESD) structure, over-voltage protection, or other electronic device.

FIG. 9, for example, shows a plan view of a hypothetical structure 901, defined within a single layer of an integrated circuit. This hypothetical structure might be for example part of a power device, such as a power transistor. As depicted, the structure includes a first conductive path 903 (which extends to the left off of the drawing page, as indicated by ellipses at the left side of the FIG.), a second conductive path 905 (which extends to the right off of the drawing page, as indicated by ellipses at the right side of the FIG.), and a complex structure having interlocking fingers, as generally represented by numeral 907 in the center of the FIG. As indicated earlier, certain portions of a design such as this can potentially benefit from heterogeneous processing techniques, i.e., by employing conventional approximations (e.g., 1D processing techniques) for certain structures, such as conductive paths 903 and 905, and while using different processing techniques for other structures, such as represented by the complex center portion 907 of the FIG. Using these techniques, an EDA tool can obtain improved analysis based on enhanced data extraction/meshing, while at the same time not substantially increasing the amount of parasitics and/or other data needed for analysis. When combined with the visualization, binarization and other techniques described herein, it should be appreciated that these various techniques provide powerful features for assisting designers in more efficiently producing, modifying and verifying IC layouts. By enabling a design to filter PLN elements and/or meshes used for computation, and zoom in and out of portions of a layout that are of interest, the techniques described above permit a designer (and design tool) to more quickly identify and focus on just the most significant bottlenecks in a design.

The foregoing description and in the accompanying drawings, specific terminology and drawing symbols have been set forth to provide a thorough understanding of the disclosed embodiments. In some instances, the terminology and symbols may imply specific details that are not required to practice those embodiments. The terms "exemplary" and "embodiment" are used to express an example, not a preference or requirement. Various modifications and changes may be made to the embodiments presented herein without departing from the broader spirit and scope of the disclosure. Features or aspects of any of the embodiments may be applied, at least where practicable, in combination with any other of the embodiments or in place of counterpart features or aspects thereof. Accordingly, the features of the various embodiments are not intended to be exclusive relative to one another, and the specification and drawings are to be regarded in an illustrative rather than a restrictive sense.

We claim:

1. An apparatus comprising instructions stored on at least one computer-readable physical storage medium, the instructions, when executed, to cause one or more processors to:

receive a designation of a first object represented in a layout file for an integrated circuit design, wherein the layout file is stored in processor-accessible physical storage, wherein the first object comprises one of a polygon, a layer, a net or a structure in the integrated circuit design, and wherein the layout file also represents a second object that is also one of a polygon, a layer, a net or a structure in the integrated circuit design;

responsive to the designation, retrieve from the processor-accessible physical storage digital information representing the first object;

using the digital information, perform multi-dimensional resistance meshing of the first object; and store data in the processor-accessible physical storage, the data representing the multi-dimensional resistance meshing of the first object, as part of a file structure which also represents one-dimensional resistance meshing of the second object.

2. The apparatus of claim 1 wherein:

the layout file comprises a post-layout netlist file;

the file structure comprises the post-layout netlist file;

the digital information comprises one or more parasitics and one or more object-size parameters; and the instructions, when executed, are to cause the one or more processors to update the post-netlist file to include the data.

3. The apparatus of claim 2 wherein the post-layout netlist file is one of a Standard Parasitic Format (SPF) file, a Detailed Standard Parasitic Format (DSPF) file, a Standard Parasitic Exchange Format (SPEF) file, an Open Access (OA) file and a SPICE netlist file.

4. The apparatus of claim 1 wherein the multi-dimensional resistance meshing is two-dimensional resistance meshing.

5. The apparatus of claim 1 wherein the multi-dimensional resistance meshing is three-dimensional resistance meshing.

6. The apparatus of claim 1 wherein the designation comprises an input from a human user, dynamically entered via a user interface of a digital device.

7. The apparatus of claim 1 wherein:

the instructions, when executed, are to further cause the one or more processors to retrieve digital information from the layout file representing plural objects, including the first object;

the instructions, when executed, are to further cause the one or more processors to apply a filter criteria to the plural objects, the filter criteria being such that the first object satisfies the filter criteria and the second object does not satisfy the filter criteria; and the designation is a result of an identification, by the one or more processors, that the first object satisfies the filter criteria.

8. The apparatus of claim 7 wherein the filter criteria comprises being less than a predetermined size, and wherein the instructions, when executed, are to further cause the one or more processors to apply the filter criteria in processing the layout file, so as to cause the file structure to include the data representing the multi-dimensional resistance meshing of the first object as well as data representing one-dimensional resistance meshing of the second object, in response automated determination that the second object has a physical dimension that is less than the predetermined size and that a physical dimension of the first object is not less than the predetermined size.

9. The apparatus of claim 1 wherein the instructions, when executed, are to further cause the one or more processors to simulate a performance parameter associated with operation of the integrated circuit design, dependent both on the data representing the multi-dimensional resistance meshing of the first object and on data which represents the one-dimensional resistance meshing of the second object, to generate from the simulation a simulation result, and to take an action comprising one of:

causing display of the simulation result to a human user via a digital display device; and store data dependent on the simulation result in a physical storage medium.

10. The apparatus of claim 1 wherein the instructions, when executed, are to further cause the one or more processors to calculate a first sensitivity, of a performance parameter to the data representing the multi-dimensional resistance meshing of the first object, and a second sensitivity, of the performance parameter to data which represents the one-dimensional resistance meshing of the second object, and to cause display to a human user via a digital device of an image which is dependent on the first sensitivity and the second sensitivity.

11. The apparatus of claim 10 wherein the instructions, when executed, are to further cause the one or more processors to cause the display of the image in a manner such that the displayed image is dependent on relative value of the first sensitivity and the second sensitivity.

12. The apparatus of claim 11 wherein the instructions, when executed, are to further cause the one or more processors to:

receive data, entered via a human interface device by a human user, representing a design change affecting one of the first object and the second object;

in response to the data representing the design change, re-perform meshing of the one of the first object and the second object;

dependent on the re-performance of the meshing of the one of the first object and the second object, re-calculate at least one of the first sensitivity and the second sensitivity, to obtain an updated sensitivity; and dynamically update the displayed image, in a manner dependent on the updated sensitivity.

13. The apparatus of claim 1 wherein the first object can be a part of a metal layer of the integrated circuit design.

14. The apparatus of claim 1 wherein the first object can be a net represented in a post-layout netlist (PLN) file corresponding to the integrated circuit design.

15. The apparatus of claim 1 wherein the first object can be an electrostatic discharge structure in the integrated circuit design.

16. The apparatus of claim 1 wherein the first object can be part of a transistor in the integrated circuit design.

17. The apparatus of claim 1 wherein:

the designation is a first designation and the multi-dimensional resistance meshing is a first type of meshing;

the instructions, when executed, are to cause the one or more processors to receive a second designation, of a third object represented in the layout file for the integrated circuit design, responsive to the second designation, retrieve from the processor-accessible physical storage second digital information, representing the third object, and using the second digital information, perform multi-dimensional resistance meshing of the third object; and the multi-dimensional resistance meshing performed for the third object is a second type of meshing.

18. The apparatus of claim 17 wherein the first type of meshing and the second type of meshing correspond to respective dimensional granularities.

19. The apparatus of claim 17 wherein the first type of meshing is two-dimensional resistance meshing and the second type of meshing is three-dimensional resistance meshing.

20. A method of operating one or more processors, comprising:

receiving a designation of a first object represented in a layout file for an integrated circuit design, wherein the layout file is stored in processor-accessible physical storage, wherein the first object comprises one of a polygon, a layer, a net or a structure in the integrated circuit design, and wherein the layout file also represents a second object that is also one of a polygon, a layer, a net or a structure in the integrated circuit design;

responsive to the designation, retrieving from the processor-accessible physical storage digital information representing the first object;

using the digital information, performing multi-dimensional resistance meshing of the first object; and storing data in the processor-accessible physical storage, the data representing the multi-dimensional resistance meshing of the first object, as part of a file structure which also represents one-dimensional resistance meshing of the second object.

\* \* \* \* \*